US007080392B1

(12) United States Patent
Geshwind

(10) Patent No.: US 7,080,392 B1
(45) Date of Patent: Jul. 18, 2006

(54) PROCESS AND DEVICE FOR MULTI-LEVEL TELEVISION PROGRAM ABSTRACTION

(76) Inventor: David Michael Geshwind, 111 Fourth Ave., NY, NY (US) 10003

( * ) Notice: Subject to any disclaimer, the term of this patent is extended or adjusted under 35 U.S.C. 154(b) by 1137 days.

(21) Appl. No.: 09/724,926

(22) Filed: Nov. 28, 2000

Related U.S. Application Data

(63) Continuation-in-part of application No. 09/504,605, filed on Feb. 15, 2000, and a continuation-in-part of application No. 08/483,205, filed on Jun. 7, 1995, now Pat. No. 6,507,872, which is a continuation-in-part of application No. 08/485,384, filed on Jun. 7, 1995, now Pat. No. 6,025,882, and a continuation-in-part of application No. 08/485,385, filed on Jun. 7, 1995, now abandoned, application No. 09/724,926, filed on Nov. 28, 2000, and a continuation-in-part of application No. 07/951,267, filed on Sep. 25, 1992, now Pat. No. 6,590,573, and a continuation-in-part of application No. 07/800,325, filed on Dec. 2, 1991.

(51) Int. Cl.
*H04N 7/025* (2006.01)
*H04N 7/10* (2006.01)

(52) U.S. Cl. .......................... 725/34; 725/38

(58) Field of Classification Search .................. 725/34
See application file for complete search history.

(56) References Cited

U.S. PATENT DOCUMENTS

| 6,020,912 | A | * | 2/2000 | De Lang ..................... 725/91 |
| 6,139,197 | A | * | 10/2000 | Banks ........................ 709/217 |
| 6,289,358 | B1 | * | 9/2001 | Mattis et al. ............... 707/203 |
| 6,487,722 | B1 | * | 11/2002 | Okura et al. .................. 725/40 |
| 6,594,825 | B1 | * | 7/2003 | Goldschmidt Iki et al. ... 725/53 |
| 2002/0013943 | A1 | * | 1/2002 | Haberman et al. ............ 725/39 |
| 2002/0126991 | A1 | * | 9/2002 | Kawamura et al. ........... 386/70 |

* cited by examiner

*Primary Examiner*—Vivek Srivastava
(74) *Attorney, Agent, or Firm*—Anne C. Avellone; UNIPAT, ORG

(57) ABSTRACT

Distribution, either incorporated into a video signal or via a separate channel, of human and/or artificially intelligent generated auxiliary information used to selectively record and/or display one of several subsets of program segments. Subsets comprise options that are progressively abstracted, alternatively rated, selectively limited to particular subject matter, or otherwise diverse versions of the program material. Settop box, or similar device, records program and auxiliary information, and displays selected subset under user control.

20 Claims, 23 Drawing Sheets

SAMPLE ABSTRACTED TELEVISION PROGRAM DISPLAY

| FRAME CODE | LEVEL 1 SET | LEVEL 2 SET | LEVEL 3 SET | LEVEL 4 SET | LEVEL 5 SET | LEVEL 6 SET | LEVEL 7 SET | LEVEL 8 SET | LEVEL 9 SET | LEVEL 10 SET |
|---|---|---|---|---|---|---|---|---|---|---|
| 0000 | PLAY | SKIP | SKIP | SKIP | SKIP | SKIP | SKIP | SKIP | SKIP | SKIP |
| 0001 | PLAY | PLAY | SKIP | SKIP | SKIP | SKIP | SKIP | SKIP | SKIP | SKIP |
| 0010 | PLAY | PLAY | PLAY | SKIP | SKIP | SKIP | SKIP | SKIP | SKIP | SKIP |
| 0011 | PLAY | PLAY | PLAY | PLAY | SKIP | SKIP | SKIP | SKIP | SKIP | SKIP |
| 0100 | PLAY | PLAY | PLAY | PLAY | PLAY | SKIP | SKIP | SKIP | SKIP | SKIP |
| 0101 | PLAY | PLAY | PLAY | PLAY | PLAY | PLAY | SKIP | SKIP | SKIP | SKIP |
| 0110 | PLAY | PLAY | PLAY | PLAY | PLAY | PLAY | PLAY | SKIP | SKIP | SKIP |
| 0111 | PLAY | PLAY | PLAY | PLAY | PLAY | PLAY | PLAY | PLAY | SKIP | SKIP |
| 1000 | PLAY | PLAY | PLAY | PLAY | PLAY | PLAY | PLAY | PLAY | PLAY | SKIP |
| 1001 | PLAY | PLAY | PLAY | PLAY | PLAY | PLAY | PLAY | PLAY | PLAY | PLAY |
| 1010 | N/A | N/A | N/A | N/A | N/A | N/A | N/A | N/A | N/A | N/A |
| 1011 | N/A | N/A | N/A | N/A | N/A | N/A | N/A | N/A | N/A | N/A |
| 1100 | N/A | N/A | N/A | N/A | N/A | N/A | N/A | N/A | N/A | N/A |
| 1101 | N/A | N/A | N/A | N/A | N/A | N/A | N/A | N/A | N/A | N/A |
| 1110 | N/A | N/A | N/A | N/A | N/A | N/A | N/A | N/A | N/A | N/A |
| 1111 | N/A | N/A | N/A | N/A | N/A | N/A | N/A | N/A | N/A | N/A |

FIGURE 1: FRAME CODES FOR TEN TELESCOPED LEVELS OF ABSTRACTION

| (210) | (220) | (230) | (240) |
|---|---|---|---|
| # | DESCRIPTION OF CONTENT | TIME | LEVEL |
| 1 | Advertizing Block 1: Three 30 Second Spots | 1:30 | 1 |
| 2 | 'Previously On' Review Segment | 0:40 | 7 |
| 3 | 'This Week On' Preview Segment | 0:20 | 10 |
| 4 | Generic Weekly Opening Credits and Music | 1:00 | 3 |
| 5 | Bumper #1 Out (with Music) | 0:10 | 2 |
| 6 | Advertizing Block #2: Four 30 Second Spots and Three 20 Second Spots | 3:00 | 1 |
| 7 | Bumper #1 In (with Music) | 0:10 | 2 |
| 8 | Opening 'Guest Star' Credits and Music | 0:20 | 5 |
| 9 | Long Artful Montage of Hospital, Quiet at Dawn, as Shift Changes | 1:30 | 4 |
| 10 | Dr. Starr, asleep at his desk | 0:12 | 5 |
| 11 | His secretary enters and gives him an exasperated but maternal look | 0:09 | 5 |
| 12 | Dr. Starr, still asleep at his desk | 0:06 | 6 |
| 13 | Secretary: "Were you here all night again?" | 0:04 | 9 |
| 14 | Dr. Starr: "Yes, I had a patient in crisis. If I don't care, who will?" | 0:07 | 9 |
| 15 | Secretary: "If you kill yourself, you won't be here to care. Go home." | 0:06 | 8 |
| 16 | Dr. Starr: "I will. I was done at 5. Thought I'd just do rounds first." | 0:06 | 8 |
| 17 | Rounds Patient #1 – A Minor Sub-Plot – Questions with Med. Students | 0:45 | 6 |
| 18 | Rounds Patient #1 – Diagnosis | 0:15 | 8 |
| 19 | Rounds Patient #2 – Comic Relief Sub-Plot – Questions with Med. Studs. | 1:10 | 7 |
| 20 | Rounds Patient #2 – Diagnosis | 0:20 | 8 |
| 21 | Rounds Patient #3 – Major Plot this Week – Questions with Med. Students | 1:30 | 6 |
| 22 | Rounds Patient #3 – Diagnosis | 0:20 | 10 |
| 23 | Rounds Patient #4 – A Minor Sub-Plot – Questions with Med. Students | 0:45 | 7 |
| 24 | Rounds Patient #4 – Diagnosis | 0:15 | 8 |
| 25 | Sound of Explosion with Reactions of Dr. Starr, Patient #4 and Students | 0:05 | 10 |
| 26 | Shot of Construction Collapse and Accident | 0:15 | 9 |
| 27 | Shots of Several Workers, Some Hurt, Some Trapped, Some Stunned | 1:15 | 5 |
| 28 | Shot of One Worker Badly Bleeding, Attended to by Another Worker | 0:30 | 6 |
| 29 | ER Clerk, Exasperated, Answering Phone | 0:10 | 4 |
| 30 | ER Clerk: "Six incoming trauma. ETA 5 minutes. Get Dr. Starr!" | 0:05 | 7 |
| 31 | Close-up of Dr. Starr's Beeper Going Off | 0:05 | 8 |
| 32 | Dr. Starr: "It looks like I won't be going home any time soon." | 0:05 | 10 |
| 33 | Bumper #2 Out (Silent) | 0:05 | 2 |
| 34 | Advertizing Block #3: Three 30 Second Spots and One 20 Second Spot | 1:50 | 1 |
| 35 | Bumper #2 In (Silent) | 0:05 | 2 |

FIGURE 2: EXAMPLES OF ABSTRACTION SCRIPT FOR 'MEDICAL MELODRAMA'

(310)

| SEG. | 1 .......... | 2 ..... | 3 ... | 4 ...... | 5 . | 6 .................... | 7 . | 8 ..... |
|---|---|---|---|---|---|---|---|---|
| CODE | 000000000000 | 6666666 | 99999 | 22222222 | 111 | 000000000000000000000 | 111 | 4444444 |

(320)

| SEG. | 1 .......... | 2 ..... | 3 ... | 4 ...... | 5 . | 6 .................... | 7 . | 8 ..... |
|---|---|---|---|---|---|---|---|---|
| CODE | 000000000006 | 6666669 | 99992 | 22222221 | 110 | 000000000000000000001 | 114 | 4444443 |

(330)

| SEG. | 1 .......... | 2 ..... | 3 ... | 4 ...... | 5 . | 6 .................... | 7 . | 8 ..... |
|---|---|---|---|---|---|---|---|---|
| CODE | 0FFFFFFFFFFF | 6FFFFFF | 9FFFF | 2FFFFFFF | 1FF | 0FFFFFFFFFFFFFFFFFFFFF | 1FF | 4FFFFFF |

(340)

| SEG. | 1 .......... | 2 ..... | 3 ... | 4 ...... | 5 . | 6 .................... | 7 . | 8 ..... |
|---|---|---|---|---|---|---|---|---|
| CODE | 0dddddddddddF | 6dddddF | 9dddF | 2ddddddF | 1dF | 0ddddddddddddddddddddF | 1dF | 4dddddF |

(350)

| SEGMENT INDEX # (351) | START TIME (352) | LEVEL CODE (353) |
|---|---|---|
| 1 | 0:00 | 0 |
| 2 | 1:30 | 6 |
| 3 | 2:10 | 9 |
| 4 | 2:30 | 2 |
| 5 | 3:30 | 1 |
| 6 | 3:40 | 0 |
| 7 | 6:40 | 1 |
| 8 | 6:50 | 4 |
| 9 | 7:10 | 3 |

FIGURE 3: EXAMPLES OF CODING ABSTRACTION SCRIPT FOR 'MEDICAL MELODRAMA'

(410)

| SEGMENT INDEX # (411) | START TIME (412) | RUNNING TIME (413) | DATE (414) | CHANNEL (415) | OTHER DATA (416) |
|---|---|---|---|---|---|
| 1 | 0:00:00 | 1:30:00 | 04/28/00 | 13 | DATA 1 |
| 2 | 1:30:00 | 0:40:10 | 04/28/00 | 13 | DATA 2 |
| 3 | 2:10:10 | 0:20:00 | 04/28/00 | 13 | DATA 3 |
| 4 | 2:30:10 | 1:00:00 | 04/28/00 | 13 | DATA 4 |
| 5 | 3:30:15 | 0:10:05 | 04/28/00 | 13 | DATA 5 |
| 6 | 3:40:15 | 3:00:10 | 04/28/00 | 13 | DATA 6 |
| 7 | 6:40:25 | 0:10:10 | 04/28/00 | 13 | DATA 7 |
| 8 | 6:51:05 | 0:20:05 | 04/28/00 | 13 | DATA 8 |
| 9 | 7:10:10 | 1:29:20 | 04/28/00 | 13 | DATA 9 |

(420)

| LEVEL | SCRIPT OF SEGMENTS IN ORDER |
|---|---|
| 1 | 1, 2, 3, 4, 5, 6, 7, 8, 9, 10, 11, 12, 13, 14, 15, 16, 17, 18, 19, 20 ... |
| 2 | 2, 3, 4, 5, 7, 8, 9, 10, 11, 12, 13, 14, 15, 16, 17, 18, 19, 20 ........ |
| 3 | |
| 4 | |
| 5 | |
| 6 | |
| 7 | |
| 8 | |
| 9 | 14, 18, 19, 167, 169, 180, 203, 205, 42, 44, 46, 310, 319, 322 |
| 10 | 14, 18, 167, 202, 44, 46, 319 |

FIGURE 4: ABSTRACTION SCHEME WITHOUT CHRONOLOGICAL ORDER REQUIREMENT

| (500) | SAMPLE ABSTRACTION PROGRAM SCRIP FILE FORMAT |
|---|---|
| ELEMENT | DESCRIPTION OF FIELD |
| (501) | Script Type |
| (502) | Script SubType |
| (503) | Script Name |
| (504) | Script Source |
| (505) | Script Author |
| (506) | Time/Date of Creation |
| (507) | Time/Date Last Modified |
| (508) | Cover Media |
| (509) | Title Media |
| (510) | TOC Media |
| (511) | Interactivity Script |
| (512) | Number of Segments |
| (513) | Segment Data |
| (514) | Other Data as Needed |

FIGURE 5: SAMPLE ABSTRACTION PROGRAM SCRIPT FILE FORMAT

| (600) | SAMPLE ABSTRACTION PROGRAM SEGMENT FILE FORMAT |
|---|---|
| ELEMENT | DESCRIPTION OF FIELD |
| (601) | Segment Type |
| (602) | Segment SubType |
| (603) | Segment Name |
| (604) | Segment Source/Author |
| (605) | Segment Channel |
| (606) | Segment Start (In) Time/Date |
| (607) | Segment End (Out) Time/Date |
| (608) | Segment Length |
| (609) | Segment Title/Header Media |
| (610) | Segment TOC Media |
| (611) | Segment Interactivity Script |
| (612) | Segments Number or Index |
| (613) | Segment Level, Rating or Other Designation |
| (614) | Keywords, CC and Other Text Categorization |
| (615) | Audio and Video Start/End Cues |
| (616) | Other Data as Needed |

FIGURE 6: SAMPLE ABSTRACTION PROGRAM SEGMENT FILE FORMAT

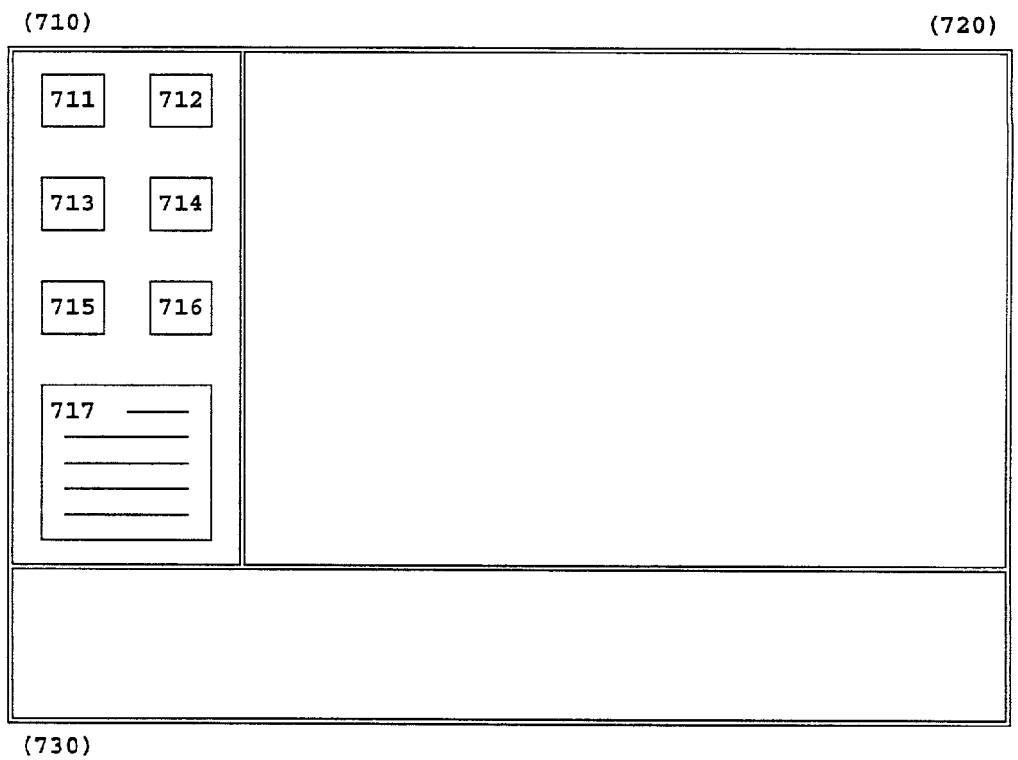
FIGURE 7: SAMPLE ABSTRACTED TELEVISION PROGRAM DISPLAY

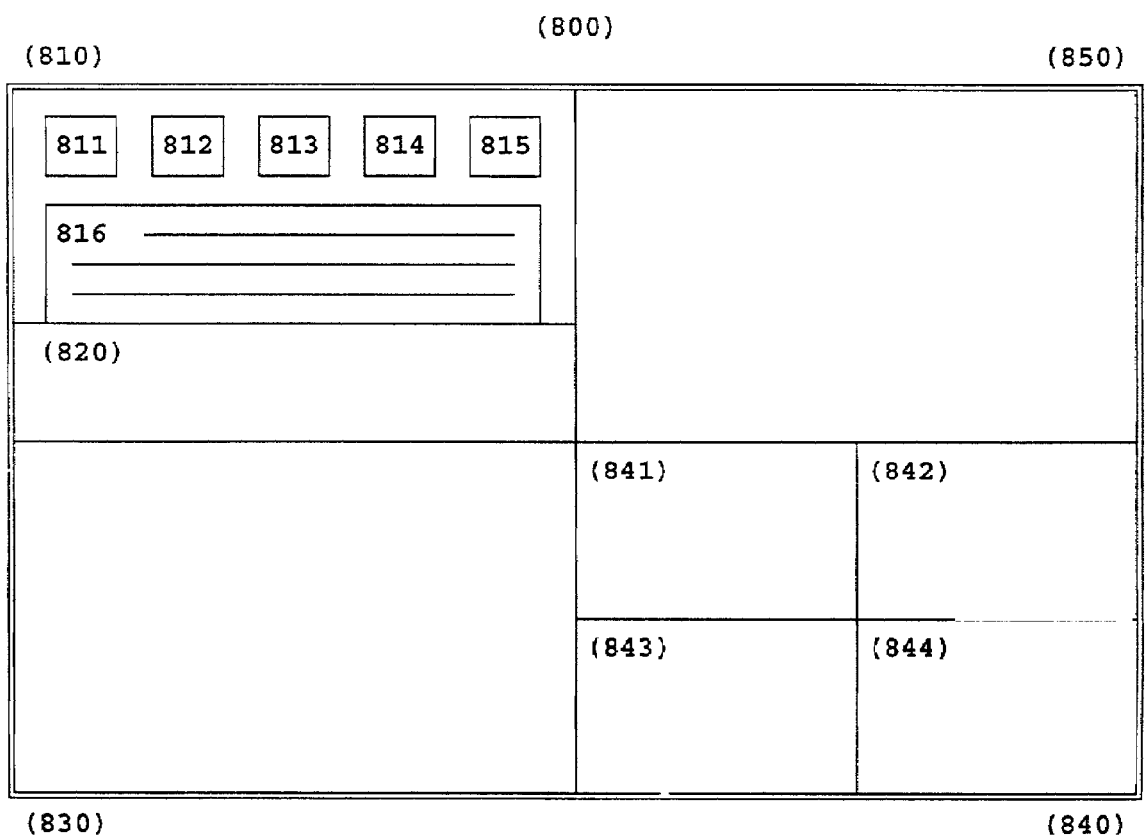
FIGURE 8: SAMPLE ADVANCED TELEVISION SCREEN

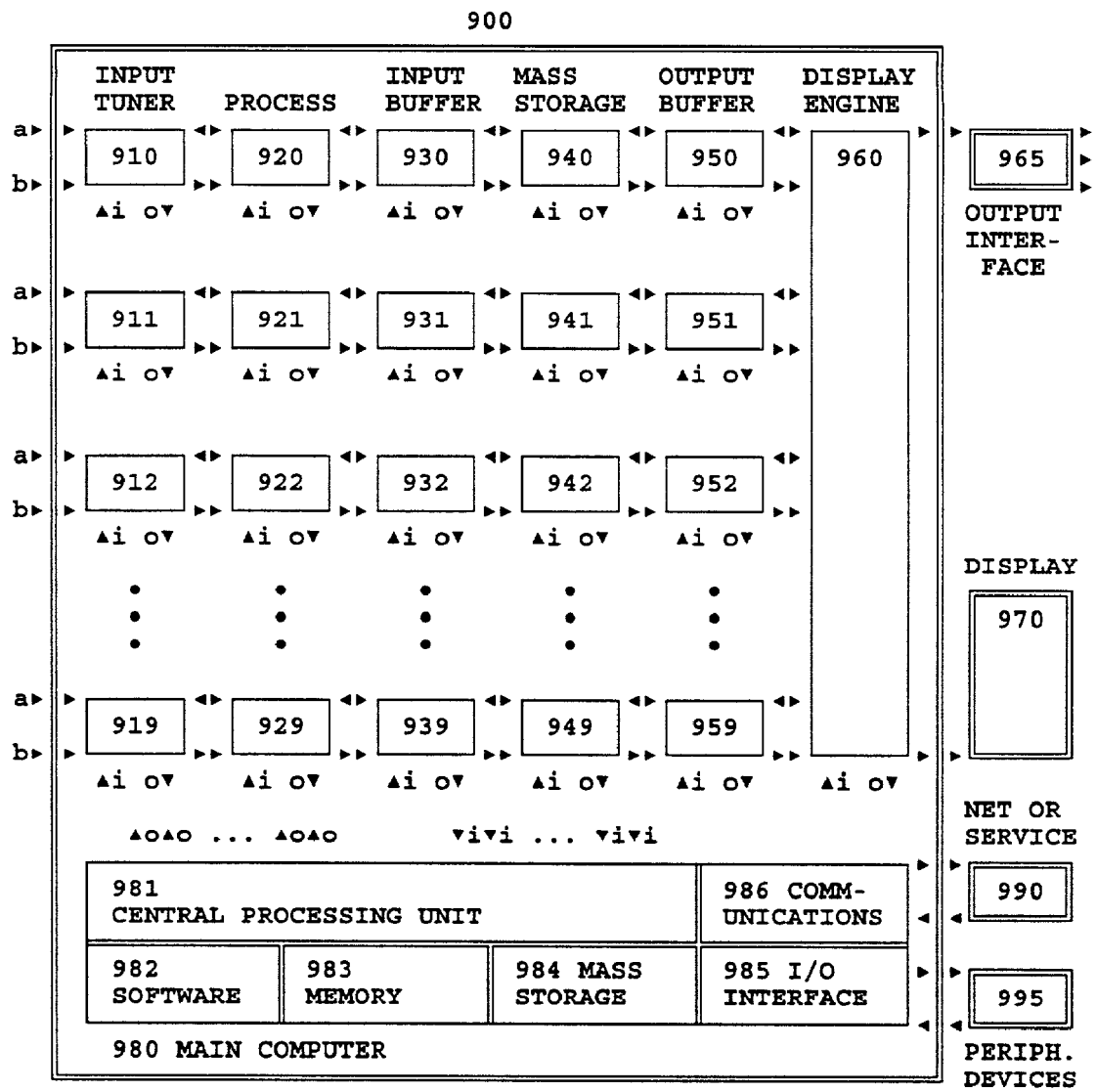
FIGURE 9A: SYSTEM DIAGRAM OF SETTOP BOX OR OTHER DEVICE

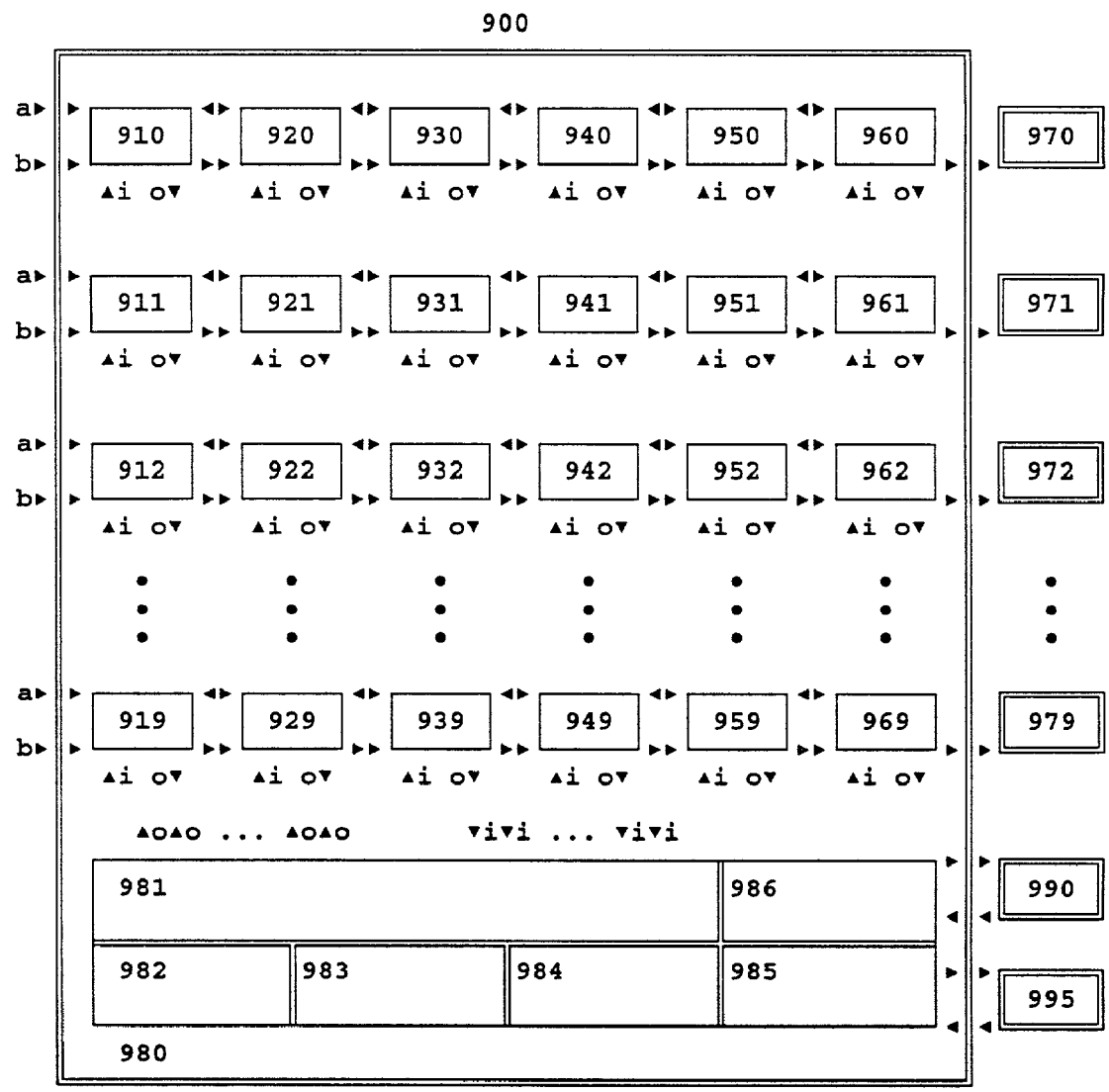
FIGURE 9B: SECOND SYSTEM DIAGRAM OF SETTOP BOX OR OTHER DEVICE

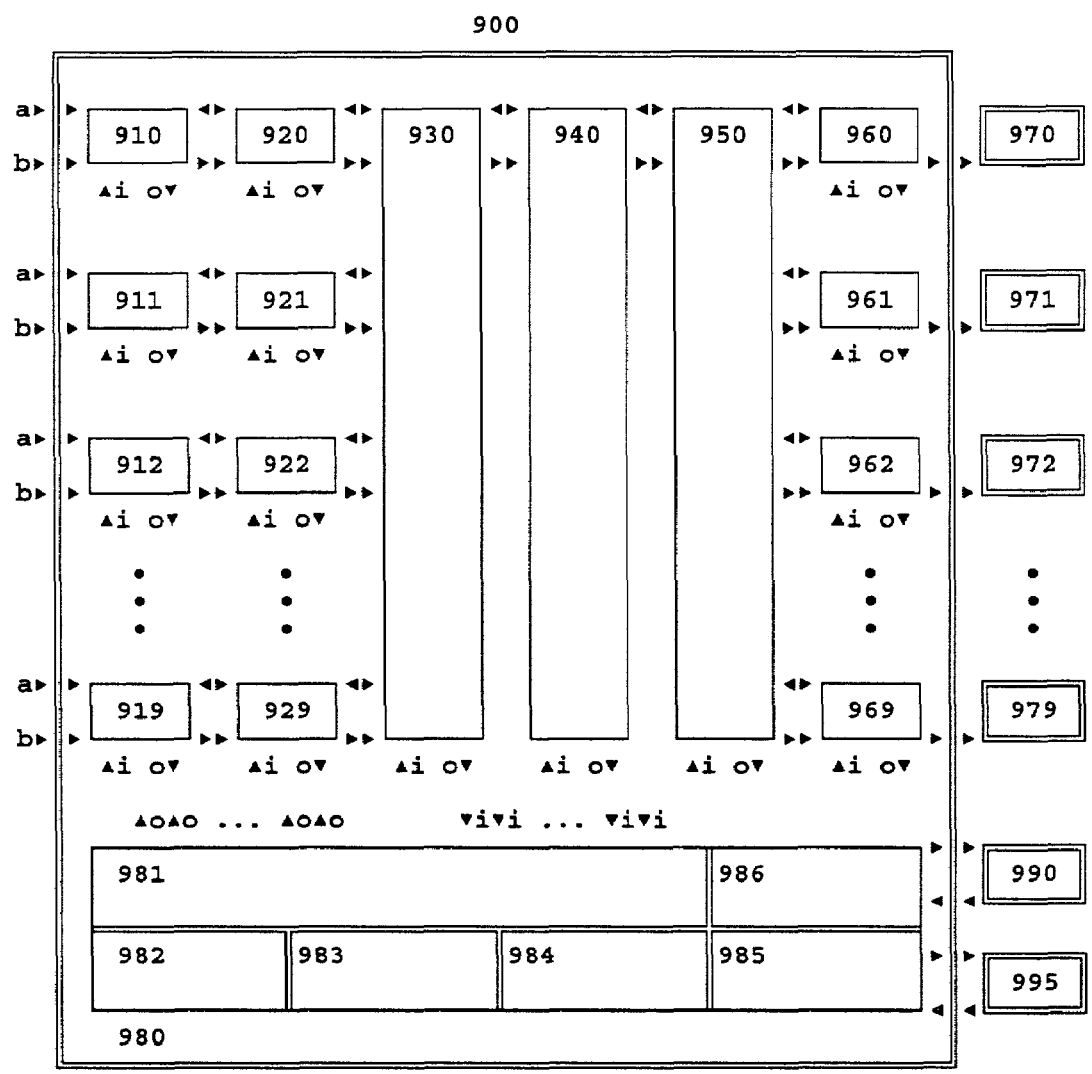
FIGURE 9C: THIRD SYSTEM DIAGRAM OF SETTOP BOX OR OTHER DEVICE

(1010)
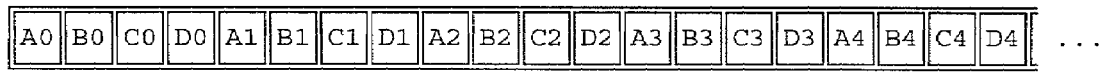
(1020)
FIGURE 10: INTERLEAVED VIDEO FRAMES WITH OPTIONAL WEIGHTING BY LENGTH (1110A)

| 1 | 2 | 3 | 4 | 5 | 6 | 7 | 8 | 9 | 10 | 11 | 12 | 13 | 14 | 15 | 16 | 17 | 18 | (1111) |
|---|---|---|---|---|---|---|---|---|----|----|----|----|----|----|----|----|----|--------|
| 3 | 22 | 25 | 32 | 13 | 14 | 26 | 15 | 16 | 18 | 20 | 24 | 31 | 2 | 19 | 23 | 30 | 12 | (1112) |
| 10 | 10 | 10 | 10 | 9 | 9 | 9 | 8 | 8 | 8 | 8 | 8 | 8 | 7 | 7 | 7 | 7 | 6 | (1113) |

(1110B)

| 19 | 20 | 21 | 22 | 23 | 24 | 25 | 26 | 27 | 28 | 29 | 30 | 31 | 32 | 33 | 34 | 35 | (1111) |
|----|----|----|----|----|----|----|----|----|----|----|----|----|----|----|----|----|--------|
| 17 | 21 | 28 | 8 | 10 | 11 | 27 | 9 | 29 | 4 | 5 | 7 | 33 | 35 | 1 | 6 | 34 | (1112) |
| 6 | 6 | 6 | 5 | 5 | 5 | 5 | 4 | 4 | 3 | 2 | 2 | 2 | 2 | 1 | 1 | 1 | (1113) |

FIGURE 11: PROGRAM SEQUENCES INTERLEAVED BY ABSTRACTION LEVEL (1210)

| A | B | C | D | A | B | C | D | A | B | C | D | A | B | C | D | A | B | C | D | A | B | C | D | (1211) |
|---|---|---|---|---|---|---|---|---|---|---|---|---|---|---|---|---|---|---|---|---|---|---|---|--------|
| 3 | 3 | 3 | 3 | 3 | 3 | 3 | 3 | 2 | 2 | 2 | 2 | 2 | 2 | 2 | 2 | 1 | 1 | 1 | 1 | 1 | 1 | 1 | 1 | (1212) |
| X | X | X | X | Y | Y | Y | Y | X | X | X | X | Y | Y | Y | Y | X | X | X | X | Y | Y | Y | Y | (1213) |

(1220)

| A | A | B | B | C | C | D | D | A | A | B | B | C | C | D | D | A | A | B | B | C | C | D | D | (1221) |
|---|---|---|---|---|---|---|---|---|---|---|---|---|---|---|---|---|---|---|---|---|---|---|---|--------|
| 3 | 3 | 3 | 3 | 3 | 3 | 3 | 3 | 2 | 2 | 2 | 2 | 2 | 2 | 2 | 2 | 1 | 1 | 1 | 1 | 1 | 1 | 1 | 1 | (1222) |
| X | Y | X | Y | X | Y | X | Y | X | Y | X | Y | X | Y | X | Y | X | Y | X | Y | X | Y | X | Y | (1223) |

(1230)

| A | A | A | A | A | A | B | B | B | B | B | B | C | C | C | C | C | C | D | D | D | D | D | D | (1231) |
|---|---|---|---|---|---|---|---|---|---|---|---|---|---|---|---|---|---|---|---|---|---|---|---|--------|
| 3 | 3 | 2 | 2 | 1 | 1 | 3 | 3 | 2 | 2 | 1 | 1 | 3 | 3 | 2 | 2 | 1 | 1 | 3 | 3 | 2 | 2 | 1 | 1 | (1232) |
| X | Y | X | Y | X | Y | X | Y | X | Y | X | Y | X | Y | X | Y | X | Y | X | Y | X | Y | X | Y | (1233) |

(1240)

|        | A | B | C  |
|--------|---|---|----|
| PASS 1 | 1 | 2 | 3  |
| PASS 2 | 4 | 5 | 10 |
| PASS 3 | 6 | 8 | 11 |
| PASS 4 | 7 | 9 | 12 |

FIGURE 12: MULTIPLE PROGRAM SEQUENCES INTERLEAVED BY ABSTRACTION LEVEL

1310

| # | DESCRIPTION OF SCENES | START | END |
|---|---|---|---|
| | 1311 / 1312 | 1313 | 1314 |
| 1 | Common Scenes Prior to Multiple Thread Section, Suitable for All Audiences | 00:00:00 | 22:15:03 |
| 2 | Multiple Thread Scene, Rated G | 22:15:04 | 22:45:24 |
| 3 | Multiple Thread Scene, Rated PG | 22:45:25 | 23:50:10 |
| 4 | Multiple Thread Scene, Rated R | 23:50:11 | 26:55:15 |
| 5 | Common Scenes After Multiple Thread Section, Suitable for All Audiences | 26:55:16 | 57:12:06 |

1320

| RATING (1321) | SEQUENCE LIST (1322) |
|---|---|
| General (G) | 1, 2, 5 |
| Parental Guidance (PG) | 1, 3, 5 |
| Restricted (R) | 1, 4, 5 |

1330

| # (1331) | DESCRIPTION OF SCENES (1332) | RATING (1333) | CODE (1334) |
|---|---|---|---|
| 1 | Common Scenes Prior to Multiple Thread Section, Suitable for All Audiences | G | 0 |
| 2 | Preliminary Kissing Scene, Rated G | G | 1 |
| 3 | Clothed Foreplay Scene, Rated PG, More Key Dialog | PG | 2 |
| 4 | Explicit Nude Scene, Rated R, Key Dialog | R | 3 |
| 5 | Common Scenes After Multiple Thread Section, Suitable for All Audiences | G | 0 |

FIGURE 13: PROGRAM ABSTRACTED FOR MULTIPLE RATINGS

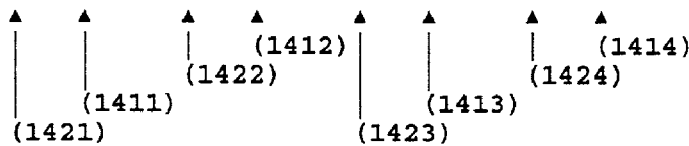
FIGURE 14: TRANSMISSION OF FILM VIA VIDEO WITH EMBEDDED AUXILIARY INFORMATION

(1500)

(1501)
ABC World News Tonight with Peter Jennings, Broadcast 6:30P, April 1, 2000
(1510)

| SUMMARY | 1 Microsoft Antitrust Decision | NEWS | TEASER | RECAP |
|---------|-------------------------------|------|--------|-------|
| (1511)  | (1512)                        | (1513) | (1514) | (1515) |

(1520)

| SUMMARY | 2 Presidential Race | NEWS | TEASER | RECAP |
|---------|---------------------|------|--------|-------|
| (1521)  | (1522)              | (1523) | (1524) | (1525) |

• • •
• • •
• • •

(1530)

| SUMMARY | N Person of the Week: Jane Roe | FEATURE | TEASER | RECAP |
|---------|-------------------------------|---------|--------|-------|
| (1531)  | (1532)                        | (1533)  | (1534) | (1535) |

(1560)

TITLE: 2 PRESIDENTIAL RACE          TYPE: NEWS (1561)

KEYWORDS: politics, president, election ... (1562)
CC. "The race for the White House heated ... (1563)
  (1564) (1565)             (1566) (1567)  (1568)          (1569)

| ◄PREV | RELATED STORIES | FULL | • • • • | NEXT► | ◄ ◄◄ ∂ ► ►► ►│ |

(1570)

| ◄PREV | ALL SUMMARIES | BY SUBJECT | MAIN MENU | • • • • • • • | NEXT► |
|-------|---------------|------------|-----------|---------------|-------|
| (1571) | (1572)       | (1573)     | (1574)    | (1575)        | (1576) |

FIGURE 15: SAMPLE USER INTERFACE: INDEXED NEWSCAST

(1600)

| (1601) News Summary for April 1, 2000 — SUBJECT: Microsoft Antitrust Decision | | | | | | | |
|---|---|---|---|---|---|---|---|
| (1610) | | | | | | | |
| SUMMARY | CNN | 4:00P | 30:00 | In Depth Report | | TEASER | RECAP |
| (1611) | (1612) | (1613) | (1614) | (1615) | | (1616) | (1617) |
| (1620) | | | | | | | |
| SUMMARY | ABC | 3:45P | 3:00 | Special Report | | TEASER | RECAP |
| (1621) | (1622) | (1623) | (1624) | (1625) | | (1626) | (1627) |
| • | • | | | | • | • | • |
| • | • | | | | • | • | • |
| • | • | | | | • | • | • |
| (1630) | | | | | | | |
| SUMMARY | NBC | 8:06P | 12:00 | Today: Gates Interview | | TEASER | RECAP |
| (1631) | (1632) | (1633) | (1634) | (1635) | | (1636) | (1637) |

(1660)

SOURCE: NBC    SEGMENT: Today: Gates Interview (1661)

SEARCH: _____ (1662)
CHOOSE: [ My Categories          ▼ ] (1663)

(1664) (1665)            (1666) (1667)    (1668)        (1669)

| ◀PREV | ARCHIVED STORIES | FULL | • • • • | NEXT▶ | ◀ ◀◀ ∂ ▶ ▶▶ ▶│ |

(1670)

| ◀PREV | ALL SUMMARIES | BY PROGRAM | MAIN MENU | • • • • • • • • | NEXT▶ |
|---|---|---|---|---|---|
| (1671) | (1672) | (1673) | (1674) | (1675) | (1676) |

FIGURE 16: SAMPLE USER INTERFACE: NEWS SEGMENTS ORGANIZED BY SUBJECT (1700)

(1701)
STORYLINE ACCESS: "One Choice to Make" on Federal Broadcast Network (1710)

| SUMMARY LEVEL | TIME PERIOD | INCLUDE | STORYLINE 1: Marriage Between John Jones and Mary Jones |
|---|---|---|---|
| Highlights ▼ | Last Year ▼ | YES ▼ | |

(1711)   (1712)   (1713)   (1714)

(1720)

| SUMMARY LEVEL | TIME PERIOD | INCLUDE | STORYLINE 2: Affair Between John Jones and Jane Smith |
|---|---|---|---|
| Essential ▼ | 3 Days ▼ | YES ▼ | |

(1721)   (1722)   (1723)   (1724)

(1730)

| SUMMARY LEVEL | TIME PERIOD | INCLUDE | STORYLINE 3: Friendship Between Mary Jones and Jane Smith |
|---|---|---|---|
| Digest ▼ | Last Week ▼ | YES ▼ | |

(1731)   (1732)   (1733)   (1734)

(1740)

| SUMMARY LEVEL | TIME PERIOD | INCLUDE | STORYLINE 4: Impending Trial Cindy Cobb for Murder of Roger Blain, Her Former Lover |
|---|---|---|---|
| Select ▼ | Select ▼ | NO ▼ | |

(1741)   (1742)   (1743)   (1744)

• • •  • • •
• • •  • • •
• • •  • • •

| ◀PREV | ALL SUMMARIES | ADVANCED | MAIN MENU | • • • • • • • • • | NEXT▶ |
|---|---|---|---|---|---|
| (1771) | (1772) | (1773) | (1774) | (1775) | (1776) |

FIGURE 17: SAMPLE USER INTERFACE: DRAMA SEGMENTS ORGANIZED BY STORYLINE

(1800)

| ELEM | DESCRIPTION | SAMPLE CONTENTS |
|------|-------------|-----------------|
| 1801 | Program | "One Choice to Make" |
| 1802 | Source | Federal Broadcast Network |
| 1803 | Time Aired | April 1, 2000 |
| 1804 | Length | 3:42:13 |
| 1805 | Characters Present | Brad and Janet |
| 1806 | Characters Mentioned | Frank and Magenta |
| 1807 | Subjects Mentioned | car accident, storm, where to go, being scared, police, occupants of mansion |
| 1808 | Storyline(s) Involved | Visit to Frank's Mansion |
| 1809 | Other Keywords | car accident, phone booth, night, storm, rain, thunder and lightening |
| 1810 | CC Text or Voice Recog. | BRAD (into phone): "Hello ... hello." <br> JANET: "Brad?" <br> BRAD: "The phone's dead!" <br> • <br> • <br> • |
| 1811 | Action(s) | conversation, telephone conversation |
| 1812 | Abstraction Script | OCTM.040100.22.DATA |
| 1813 | Current Location(s) | Archive Disk: "OCTM3" |

FIGURE 18: SAMPLE DATA FILE FOR PROGRAM SCENE

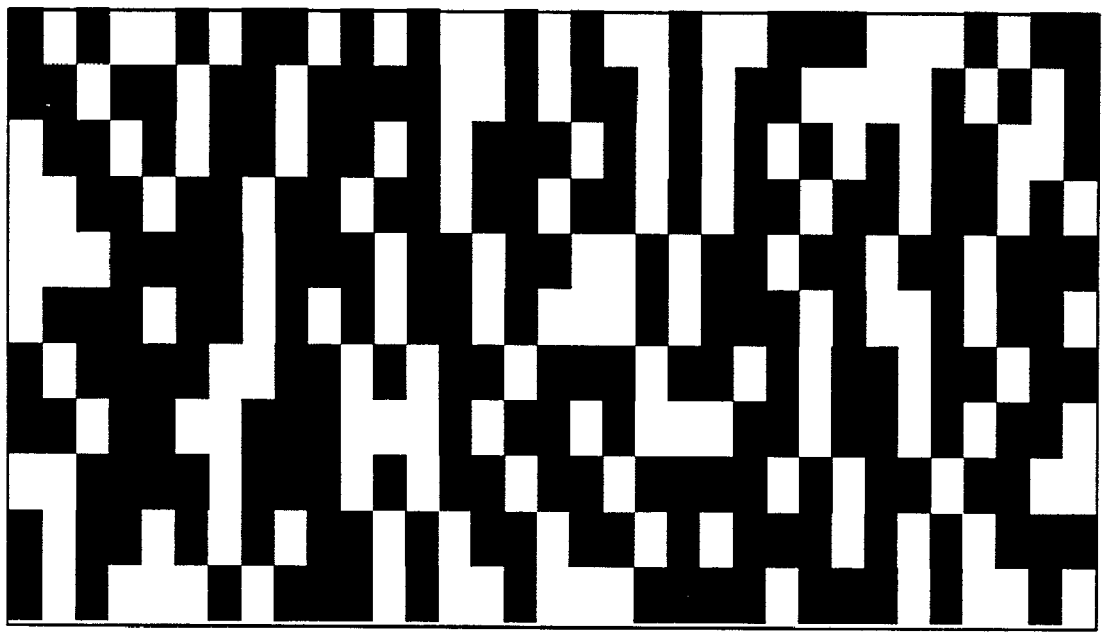
FIGURE 19: SAMPLE OF DATA VISUALIZED FOR VIDEO RECORDING

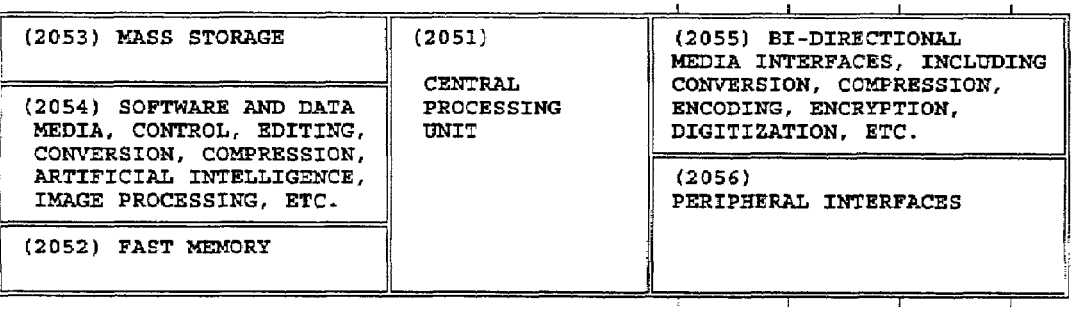
FIGURE 20: MEDIA ORGANIZATION SYSTEM

(2101)

| AI PRELIMINARY ATTEMPT AT SEGMENTATION |

(2102)

| HUMAN CONFIRMATION OF SEGMENTATION |

(2103)

| AI PRELIMINARY ATTEMPT AT DECOLLATION |

(2104)

| HUMAN CONFIRMATION OF DECOLLATION |

(2105)

| HUMAN AND/OR AI ATTEMPT (WITH HUMAN CONFIRMATION) AT PROGRESSIVE SUMMARIZATION OF MATERIAL |

(2106)

| OPTIONAL RE-COLLATION OF MATERIAL AND/OR EDIT INFORMATION |

(2107)

| OPTIONAL INTEGRATION OF PROGRAM AND AUXILIARY INFORMATION |

(2108)

| DISTRIBUTION OF INTEGRATED OR AUXILIARY INFORMATION |

FIGURE 21: BASIC ABSTRACTION PROCESS FOR GENERAL PROGRAMMING

PROCESS AND DEVICE FOR MULTI-LEVEL TELEVISION PROGRAM ABSTRACTION

CROSS-REFERENCE TO RELATED APPLICATIONS

The instant application is a continuation-in-part of U.S. patent application Ser. No. 08/483,205, filed Jun. 7, 1995 now U.S. Pat. No. 6,507,872. It is also a continuation-in-part of U.S. patent application Ser. No. 09/504,605, filed Feb. 15, 2000; which is itself a continuation-in-part of U.S. patent application Ser. No. 08/485,384, filed Jun. 7, 1995, now issued as U.S. Pat. No. 6,025,882 and U.S. patent application Ser. No. 08/485,385, filed Jun. 7, 1995 now abandoned. It is also a continuation-in-part of U.S. patent application Ser. No. 07/951,267, filed Sep. 25, 1992 now U.S. Pat. No. 6,590,573, and U.S. patent application Ser. No. 07/800,325, filed Dec. 2, 1991. Related applications are U.S. patent application Ser. No. 08/488,222, filed Jun. 7, 1995 and U.S. patent application Ser. No. Number 06/492,815 filed May 9, 1983, now issued as Patent EU 0144352 B1. All these applications and patents are the sole invention of the instant inventor, and are hereby incorporated, in their entirety, by reference.

BACKGROUND OF THE INVENTION

1. Field of the invention:

The instant invention relates to the distribution, either incorporated into a, generally video, program signal (e.g., in the vertical blanking interval ("VBI") or other portion of the signal not devoted to program information, of the associated or a previous frame) or via a separate channel, of human and/or artificial intelligently generated auxiliary information. The auxiliary information is used to selectively record and/or display one of several subsets of program segments. These subsets comprise options that are progressively abstracted, alternatively rated, selectively limited to particular subject matter, or otherwise diverse versions of the program material. A settop box, advanced, digital or HDTV television, multimedia computer, or other similar device, records and/or displays the selected subset of program segments under control of the auxiliary information and user input.

2. Description of Related Art:

Those who practice the instant invention are those familiar with, and skilled in, arts such as: electrical, electronic, systems, computer, digital, communications (e.g., digital and analog communications network, telephone, audio, video, radio, television, broadcast, cable, etc.) and other related hardware and software engineering and design disciplines; media technology; production, programming and editing of computer media, interactive media, multimedia, computer graphic and animation, video, audio and other media; interactive media and human interface design; artificial intelligence, neural networks, expert systems, fuzzy logic, etc.; image processing, sound processing, speech recognition and pattern recognition; etc. Nevertheless, the inventive matter does not constitute these arts in and of themselves, and the details of these arts are within the public domain and the ken of those skilled in the arts.

The instant disclosure will not dwell on the details of system implementation in such arts but will, instead, focus on the novel designs of: systems, data structures, interfaces, processes, functions and program flows, and the novel purposes for which these are utilized.

The instant application relies on the existence of well-known systems and components including, but not limited to: personal computers; multimedia systems; systems used for the production and broadcasting or cablecasting of analog and digital media including television, multimedia and interactive media; the use of VBI, SAP and other 'piggybacked' signals; delivery of information via communications networks, including the internet optical and magnetic recording of analog and digital signals, including computer and video information; settop boxes, advanced, digital and HDTV televisions, multimedia computers, and other consumer electronic devices including TiVo, Replay, the 'V-Chip', etc.; professional and home Intercast (VBI insertion/detection) equipment; 'digital video library' and other multimedia access and search systems; and, other related devices and technologies, and those which may be substituted for them. In fact, consumer devices now available, such as TiVo, with little to no modification, provide all the necessary elements, except some additional software control functions, to perform many of the embodiments, as described herein; and, the necessary modifications and/or additions are within those skilled in the appropriate arts.

The intended scope of the instant invention also includes the combination with other related technologies, now in existence or later developed, which may be combined with, or substituted for, elements of the instant invention.

BRIEF SUMMARY OF THE INVENTION

The instant invention relates to the distribution of auxiliary information used to selectively record and/or display one of several subsets of segments of (generally video) program material. These subsets comprise options that are progressively abstracted, alternatively rated, selectively limited to particular subject matter, or otherwise diverse versions of the program material.

The auxiliary information, generally some form of edit list and/or segment marking, is created by human and/or automated, artificially intelligent, review and analysis of the program material. It is provided by the program producer or distributor, or from some third party.

The auxiliary information is incorporated into the, generally video, program signal, e.g., in the vertical blanking interval ("VBI"), closed captioning ("CC") portion, second audio program ("SAP"), or other part of the analog or digital signal not used for video or program material; of the associated or a previous frame. Alternately, it is delivered via a separate channel which may be broadcast, cablecast, network-mediated (e.g., via internet, telephone, or other communications network), or by any other available means of distribution. Alternately the program and/or auxiliary information may be delivered, separately or together, on computer or video disk or tape, CD-ROM, DVD or other media utilizing magnetic, optical or any other available technology. The program and auxiliary information may be received or input synchronously or asynchronously; with either arriving first, or arriving simultaneously.

A settop box, advanced or digital television, multimedia computer, or other similar device, retains only the user designated subset(s) of program material, under control of the auxiliary information. Alternately, the program and auxiliary information are recorded, and the designated subset(s) are extracted from the entire program in an 'offline' editing mode. Alternately, again, the program and auxiliary information are recorded, and the designated subset(s) are displayed under control of a combination of the auxiliary information and user input. In this last mode, the user may change their selection, viewing different subsets at distinct times, or changing their selection interactively during a single viewing/reviewing session. The program material, in its entirety or merely subset(s), and/or auxiliary information is retained, or is moved to longer-term mass-storage within the device, or is off-loaded to an external analog or digital device (e.g., computer or video, magnetic or optical, disk or tape, recorder) for archival storage. Alternately, one or both are discarded after use.

BRIEF DESCRIPTION OF THE SEVERAL VIEWS OF THE DRAWING

FIG. 1 depicts frame codes for telescoped levels of abstraction.

FIG. 2 depicts examples of an abstraction script for a 'Medical Melodrama'.

FIG. 3 depicts examples of coding an abstraction script for a 'Medical Melodrama'.

FIG. 4 depicts an abstraction scheme without a chronological order requirement.

FIG. 5 depicts a sample abstraction program script file format.

FIG. 6 depicts a sample abstraction program segment file format.

FIG. 7 depicts a sample abstracted television program display.

FIG. 8 depicts a sample advanced television screen.

FIG. 9A depicts a system diagram of a settop box or other device.

FIG. 9B depicts a second system diagram of a settop box or other device.

FIG. 9C depicts a third system diagram of a settop box or other device.

FIG. 10 depicts interleaved video frames with optional weighting by length.

FIG. 11 depicts program sequences interleaved by abstraction level.

FIG. 12 depicts multiple program sequences interleaved by abstraction level.

FIG. 13 depicts a program abstracted for multiple ratings.

FIG. 14 depicts the transmission of film via video with embedded auxiliary information.

FIG. 15 depicts a sample user interface for an indexed newscast.

FIG. 16 depicts a sample user interface for news segments organized by subject.

FIG. 17 depicts a sample user interface for drama segments organized by storyline.

FIG. 18 depicts a sample data file for a program scene.

FIG. 19 depicts a sample of data visualized for video recording.

FIG. 20 depicts a system diagram for a system to edit and organize media.

FIG. 21 depicts the basic abstraction process for general programming.

DETAILED DESCRIPTION OF THE INVENTION

Motivation:

Television plays a substantial role in the lives of many adults and children. Through the use of VCRs to timeshift, replay, review and archive broadcast programs, and to play prerecorded programs, people attempt to control television rather than have it control their lives. Videodisc and DVD players provide the ability to go to specific frames or 'chapter headings' or access descriptive information. More recent consumer products, such as TiVo and Replay, comprise digital video recording systems, in settop boxes, that provide additional programmability and flexibility such as more sophisticated recording and playback functions. These settop boxes are capable of recording up to 30 hours of television, and also offer a service that provides functions such as, among others, the ability to schedule a television recording just by hitting a button during a 'promo' advertisement. The channel and time being viewed are noted by the system, the program being advertised is accessed from a database, and the recording is scheduled without further significant user intervention. They also provide TVGuide-like services for scheduling recordings. In addition, they provide the ability to manually (e.g., by pressing a button) specify the kind of special effects available with a VCR, but with 'live' television, such as pauses, replays and slow motion replays, and the ability to fast forward and skip over unwanted material (e.g., a cleaner version of the commercial skipper function, as described immediately below) so long as there is sufficient material in the storage buffer. Other functions, such as automatic 'commercial skippers' that quickly pass by a fixed amount (generally 30 or 60 seconds) of material, are built into some VCRs. The 'V-Chip' provides a mechanism whereby parents may block entire programs, which fall into objectional categories, from being viewed by their children. Nevertheless, these systems are often hard for the general public to learn and use; and the level of control over television that is provided is often inadequate.

The instant invention facilitates a high level of fine control over television programming. By providing a combination of fairly simple user requests and detailed auxiliary information, to a settop box, custom versions of previously recorded broadcast programs may be watched by individual viewers. One result is a great savings in time spent watching television by eliminating content material that is not wanted, or which is not strictly necessary to comprehend program content. Another result is a finer degree of control over the content of children's programming than is provided by the 'all or nothing' V-Chip. A third result is the ability to preview material, by a brief abstract or 'trailer' or by indexing of content; and, to then select whether, and how much or what parts, to view. Additional features include the ability to interactively select a level of program detail; and, to review, in greater detail, selected sections of a program.

Auxiliary Information and Abstraction:

There are systems, such as the 'digital video library' designed for the archiving of, and search-driven access to, media, including video. These systems, generally, limit their content to news and documentaries, and are designed to function in library and academic settings. Their purpose is to enhance the ability to comprehend, navigate, organize and utilize the informational content of such material. The temporal character of such collections is archival. The process of adding to such libraries is time consuming and they are not kept exceptionally current.

In contrast, the instant invention relates primarily to providing information auxiliary to a broadcast or cablecast, as a service; the auxiliary information is provided with the program material or separately; during, soon after, or even prior to the program distribution; and the program is of general television material, primarily entertainment, but also sports, news, etc.

The auxiliary information is, generally, expensive to produce in terms of human effort or very high performance artificial intelligence processing; and the review, selection and editing functions could not reasonably be performed by individual consumers. However, by distributing this information to many subscribers the cost is amortized. The concentrated effort put into the creation of the auxiliary information permits the required complex functions to be performed by relatively low performance home or consumer quality equipment, under viewer control.

Forms of the term 'video abstraction' are used, and well known, in the field. The following definition from a web glossary[1] is typical:

ABSTRACT—
  Abstracting video: a video stream is transformed into a reduced set of still images (descriptive key frames). Video abstractions are used to do digital video library. Users can cheaply (in terms of access, transfer, and viewing times) review a video abstraction before deciding to incur the cost of accessing richer information layers or a complete video clip.

As used herein, the term abstraction is not conceptually in conflict with the above; yet, as will be seen, neither is it so limited. In particular, when using forms of the term 'video abstraction':
  the abstraction is often, but not necessarily, a reduced summary. Abstraction also refers to a version adhering to a rating criteria; restricted to a particular subject, storyline, character, etc.; or, a compilation of segments based on some criteria (i.e., an expansion with respect to a single program, yet a summary of a set of programs).
  the defined abstraction comprises still frames (e.g. a post facto storyboard); yet, as used herein, the abstraction is, generally, comprised of moving video segments.
  the defined abstraction is a single, fixed, structure; yet, as used herein, the abstraction is a complex superstructure that permits customized abstracted programs to be presented to the viewer, based on their own choices.

Neither is this use in conflict with the English definition of the word. According to wordsmyth.net, the noun abstract is:
  1. a summary; synopsis.
  2. the concentration of the essential characteristics of something greater; essence.

Thus, when discussing a multi-level video (or, more generally, a media) abstraction, what is meant is that a program is enhanced by providing information permitting multiple essential subsets (based on some specified criteria and viewer choice) to be extracted for viewing.

Progressively Abstracted Summaries:

The general method of the instant invention will most easily be understood by describing the operation of a typical application. One advantage of the instant invention is that the amount of time spent watching television may be greatly reduced by recording and subsequent playback of programs with the inventive system. Television programs of all kinds—comedy, drama, sports, news, etc.—to some degree contain material that is not necessary to comprehend the essential content of the program. The instant invention offers a number of 'levels of detail' or, conversely, 'levels of abstraction' when playing back programs that have been recorded on the system and for which the required auxiliary information has also been recorded, downloaded or otherwise been made available. For example, for a nominal one-hour drama, the following ten options, or levels of abstraction, are offered.
  1. FULL PROGRAM: The entire program, including commercial advertizements; 60 minutes.
  2. NO ADS: The entire program, but with commercial advertizements removed; 45 minutes.
  3. NO ADS OR BUMPERS: The entire program, but with commercial advertizements and 'bumpers' (the program graphics, generally with music, preceding and following commercial breaks) removed; 42 minutes.
  4. NO ADS OR CREDITS: the entire program, but with commercial advertizements, 'bumpers', and opening and closing credits removed (this is the full story; 38 minutes.
  5. BARE NARRATIVE: The full story, but with dramatic pauses, musical interludes, and solely artistic visual transitions also removed; approximately 28 minutes.
  6. TRIMMED BUT INTACT: The bare narrative, as in option 5, but with shots comprising redundant or non-essential dialog and action also removed; approximately 20 minutes.
  7. ESSENTIAL STORY: The 'intact' narrative, as option 6, but with additional narrative details and/or lesser plot elements removed; approximately 10 minutes.
  8. DIGEST: A dialog and action sketch of essential scenes within major story lines; approximately 5 minutes.
  9. TRAILER: Key shots from major story elements; approximately 2 minutes.
  10. HIGHLIGHTS: Tantalizing bits of dialog and action to pique interest, similar to 'promo' or 'next week on' clips; approximately 30 seconds to 1 minute.

In one embodiment, these ten levels of detail are strictly telescoped; that is, each level is a subset of the material of the previous level, nothing is added to a shorter abstraction that was not in the previous level, material is only deleted.

Alternately, a single shot or bit of dialog that is particularly captivating, or succinctly summarizes a scene, is included in a low level abstraction (e.g., digest, trailer, or highlights) because it is the most succinct or exciting single shot that is representative of a particular scene. However, in higher level abstractions (e.g., trimmed but intact, or essential story) several other shots, which take more screen time but tell the story better, are used to represent the scene, and the single scene under discussion is removed.

The difference in coding, between strictly telescoped and not, with only ten levels, is not too substantial, but for more complex embodiments the principle is the same and is more significant. These ten levels are remapped to the first ten of sixteen codes available with the four-bit digital numbers 0 (0000) through 15 (1111, or Hex F) and these codes are inserted into the video frame (e.g., in the VBI) or in some separate signal, as the auxiliary information. With four bits, up to 16 levels (coded 0-F Hex) of abstraction can be specified, but only 10 (coded 0–9 Hex) are used in this example. With a strictly telescoped structure, if a frame is present in a particular level N, it is also present in all higher (but, lower numbered) levels. Thus, the algorithm is: if a frame is coded for level N, it is played when the selected level is N or lower. See FIG. 1.

If the edited levels of abstraction are not strictly telescoped, and a particular sequence or frame may be present in one level, disappear in a lower level, an reappear in a still lower level, then one bit is needed for each level. In this case 10 levels requires 10 bits per frame for coding. In practice 16 bits may be a minimum, as such information is often required to be in multiples of four or eight bits. If a bit is on (1) the frame is recorded/displayed if the associated level is selected; if the bit is off (0) it is not recorded/displayed. The difference is between 2 and 4 times as much information required per frame (or field) for non-telescoped structures. With more levels the ratio increases. And, with approximately 108,000 frames (216,000 fields) in an hour program, the amount of information required for coding is a consideration.

FIG. 2 shows a 'script' abstracting the first few minutes of a television broadcast, for a hypothetical 'Medical Melodrama'. Tabulated are a sequence (210) of narrative segments (220); each of a particular length (230) which is listed simply in minutes and seconds but which, more often, includes additional digits for 'frames' and may, in theory, be as short as a single frame or video field; and, a single abstraction level in the telescoped embodiment.

If the non-telescoped embodiment were used here, the single level number (codable into four bits) would be replaced by ten (or, in practice, perhaps 16) bits, each indicating membership of the segment in a corresponding level of abstraction. The ten bits can also be represented as a single number between 0 and 1,024 decimal.

In particular, if only 10 of 16 bits are used to assign each segment to membership in between 0 and 10 levels, the remaining bits may be used for other purposes. For example, ignoring for the moment that the opening and closing credits have been eliminated between levels 4 and 5 in the scheme already described, these (or other specialized segments) may be separately assigned a coding bit so that independent of which level is chosen, the opening and closing music may be included, as per a viewer request distinct from the level selected. In this way, even when viewing a 5 minute digest of a program, the 1 minute opening and :30 closing may be included. Even though a particular viewer is satisfied with a 5 minute digest, they may not feel they have seen their favorite program unless they have heard the associated 'jingle'. Similarly, in another example, certain scenes (independent of what levels they are tagged for) may also be separately tagged with an unused bit as 'spoiler' segments. In this way a viewer may safely view a 'digest' or 'highlight' abstraction with the 'no spoilers' option, and guarantee that, if they then choose to view a fuller version, dramatic surprises will not be ruined. For example, consider a lengthy scene in a police drama that has been abstracted in the 'digest' level to two short segments: A. "There's been another assault at the university."; and B. "I knew Ferris was a bad cop . . . but, I didn't know he was a rapist!". Segment B is tagged as a 'spoiler' and is not shown to those viewing the digest as a preview in order to decide whether to view the entire program.

Further, the segments shown here are of various lengths, and have been generally segmented into the largest continuous segments that are assigned to a single level. But, even in this brief example, segment pairs 10 & 11, 13 & 14, and 15 & 16 could have been combined because they are coded for the same level. In general, if only a part of a segment is used at a first level, but the entire segment is used at a second level, the segment is to be split into two parts. One part is coded for the first level, and both parts are coded for the second level.

FIG. 3 shows several ways that the content of the script of FIG. 2 can be coded. First note that the level numbers run from 1 to 10 (or 16 assuming that each code is 4 bits, a half byte, or 'nibble'), but that the digital codes run from 0 to 9 (or 15) in decimal, from 0000 to 1001 (or 1111) in binary, or from 0 to A (or F) in hexadecimal (base 16). These are just a few illustrative examples, the number of ways that such auxiliary information may be coded, embedded or incorporated into a signal, or distributed separately, are tremendous and, in and of themselves, generally not the subject of the instant invention.

Table (310) shows a schematic of the first 8 segments of the program. The dots in the top row indicate that each indexed segment goes on for a number (roughly proportional) of frames. The codes in the bottom row indicate that the level code is embedded in each frame, e.g., in the VBI of the frame.

Table (320) is similar to (310) except that the code in the VBI of a particular frame refers to the level of the subsequent frame. The offset shown is a single frame, but it may be made longer to provide additional time. Such an offset would give the computer in the settop box extra time to compute and prepare to process the coming frame properly.

In table (330) the level code is encoded into the first frame of each segment. Additional frames in the segment are coded with 15 decimal, F hexadecimal, a code reserved, in this case, for "continue".

Table (340) is similar to (330) except that all the redundant 'F's (except for the last, which signals a change is to come) have been replaced by 'd's representing data or other types of auxiliary information, for example: other information, such as keywords or ratings, describing the content of the segments; or, text or graphics to be displayed as an index, heading, overlay, etc. A one minute segment, for example, goes on for 900 frames or 3600 bits or 450 bytes of data; so the scheme permits significant additional data to be embedded even into this very simple structure. The data may be arbitrary, including 'F's. Thus, not only is F reserved as the 'change segment next frame' code, but 'E' is reserved as the escape code so that 'EE' translates into a data nibble 'E', and 'EF' translates into a data nibble 'F'.

Table (350) schematizes the data for the auxiliary information to be structured and transmitted as a 'scrip', rather than as a frame-by-frame scheme. This script is transmitted by any means, including embedding it into VBIs; but, it is optionally transmitted asynchronously and separately from the video (or other) program signal. For each segment there is supplied a segment index (351), a start time for the segment, measured from the beginning of the program (352), and the level code (353).

FIG. 4 shows a simple embodiment of an alternative abstraction 'scripting' scheme that does not require that all material be displayed in chronological order. That is, not only may material be skipped over with this scheme, but material may be re-ordered as well. There are two parts to the script. The first is table (410) which only shows nine entries but which, in general, will have dozens to hundreds of entries per program. Column (411) lists a sequence of segment index numbers; column (412) lists a start time for each segment, in this instance in minutes, seconds and frames (hours digits not shown); and, column (413) lists a duration for each segment. The start times shown are from the start of the program, but alternatives are: SMPTE, or other, time code; local time or GMT; or any other time marking schemes, and may include date as well. Alternately, as shown in column (414) the date is explicitly available as a separate entry. Although all the dates are the same in this example, segments from several programs on several dates can be included in a single abstracted program, as is discussed in more detail below, for example, with respect to news programming. Similarly, the sequence numbers may be extended to include digits specifying a channel designation, program designation, and segment sequence number. Alternately, as shown in column (415) the channel is explicitly available as a separate entry. Although all the channel designations are the same in this example, segments from several programs on several channels can be included in a single abstracted program, as is discussed in more detail below, for example, with respect to news programming.

In this way, abstracted programs of the invention are, optionally, assembled from different programs, on different channels, and at different times and dates. For example, a customized news or clip 'package' on the 'G7 Economic Summit' would include a clip of 2:25 in length from ITN News on PBS at 6:03:14 PM; a 1:45 clip from ABC World News Tonight at 6:35:12 PM; a 2:05 clip from CBS Evening News at 6:34:25 PM; a 1:52 clip from NBC Evening News at 6:35:15 PM; a clip of length 4:20 from Good Morning America on ABC, the following morning at 8:12:10 AM; and, a clip 5:45 from The Today Show on NBC at 8:09:10 AM. Note the overlap, multiple dates, multiple channels, and disjoint nature of the clips that make up this abstraction script.

Table (420) shows rows for each of the ten abstraction levels (levels 3 through 8 not populated) comprising lists of segments to display in order. The top row, representing part of the Level 1 abstraction, includes the entire program, including advertizements, and, thus, comprises each segment in order. Consequently, the Level 1 script, which is the longest, need not be transmitted; it is a known algorithm. The partial level 2 script corresponds to the table in FIG. 2, with only segments 1 and 6 removed from the segments shown. The level 9 and level 10 scripts exhibit the aspect being demonstrated here. Note that the first four entries for level 10 (14, 18, 167 and 202) skip many segments, but are otherwise in increasing order. However, the next two entries (44 and 46) skip backwards to an earlier part of the program. The last segment (319) jumps forward again past any segments shown previously. With the scheme shown in FIGS. 2 and 3, this temporal jumping back and forth is not possible.

FIG. 5 shows a Sample Abstraction Program Script File Format (500). This is an illustrative example and is not meant to be limiting in any way. The details of file formats, and database construction and operation, are well known in the art of computer science and, in and of themselves, are not the substance of the instant invention. Database file (500) includes the following fields, some self-explanatory:

501 Script Type—e.g., abstraction by level of detail (i.e., pyramidized video, see parent application Ser. No. 08/483,205 regarding use of the term pyramidized), content ratings, story line, character, etc.; indexed by segment or subject matter; etc.

502 Script SubType—an additional level of categorization and/or version.

503 Script Name—a text designation for the script.

504 Script Source—e.g., producer, distributor, third-party service, end user, etc.

505 Script Author.

506 Time/Date of Creation.

507 Time/Date Last Modified.

508 Cover Media—here (and in later elements) 'media' includes any combination of audio, video, text, graphics, animation, icons (e.g., 'start program' or 'exit'), windows, etc., optionally with interactivity; and, 'cover' refers to a 'wrapping' presentation, like a book jacket, or show opening, meant to be more entertaining or aesthetic than informational, and pertains to the type, subtype and/or specific program. This information is embedded within this field, or the field merely consist of one or more pointers to appropriate files.

509 Title Media—is similar to (508) but more informational, pertaining to the specific program.

510 TOC Media—the media (generally, an interactive text menu) used to access specific segments, or sections, or abstracted versions of the program.

511 Interactivity Script—comprises any interactive program not covered in (508–510).

512 Number of Segments.

513 Segment Data—for each segment, as shown in FIG. 6. The data may be embedded in this field, or the field may contain a pointer to a composite file, multiple files, a linked-list or other data structure.

514 Other Data as Needed—an almost limitless number of variations on, and additions to, the above will be implemented by individual practitioners for any particular program and system; e.g., will include information about source program, etc.

FIG. 6 shows a Sample Abstraction Program Segment File Format (600), generally supplied for each segment referenced (513) in a script (500); either pointed to or embedded within the script; as a composite file of all segment data, or a separate file for each segment. This is an illustrative example and is not meant to be limiting in any way. The details of file formats, and database construction and operation, are well known in the art of computer science and, in and of themselves, are not the substance of the instant invention. Database file (600) includes the following fields, some self-explanatory:

601 Segment Type—e.g., audio, video, text, audio/video, on-line data, HTML, etc; required or optional; etc.

602 Segment SubType—an additional level of categorization and/or version.

603 Segment Name—a text designation for the script.

604 Segment Source/Author—the program, distributor and author of the transmission being abstracted in this segment.

605 Segment Channel—broadcast or cablecast channel, web address, etc.

606 Segment Start (In) Time/Date—start time of record, store or display.

607 Segment End (Out) Time/Date—end time of record, store or display.

608 Segment Length—generally derived from by subtracting (606) from (607).

609 Segment Title/Header Media—see (508) for the word 'media' as used here; this information specifies how the segment is referred to and presented to the user.

610 Segment TOC Media—similar to (609) but meant to be assembled into a 'table of contents', in combination with this same field taken from many segments.

611 Segment Interactivity Script—segment component comparable to (511).

612 Segments Number or Index—refers back to placement in referring script. Note that if the same segment is referenced by several scripts this field may need to have multiple back-pointers, or it may not be possible to unambiguously create this field.

613 Segment Level, Rating or Other Designation—if applicable, specifies the abstraction level (see discussion of FIGS. 1 through 3); a content rating similar to those used by the MPAA or the TV Parental Guidelines used with the V-Chip; the story line, character or subject category, etc.

614 Keywords, CC and Other Text Categorization—text material that may be searched, generally by the local settop box at the user's request, for applicability or interest, in order to determine if it is desirable to record or display the segment. Optionally includes keywords supplied by the inventive service, closed caption, HTML or other program text; a human typed, or voice recognition generated, text transcription of the audio track; or, other text field derived by a human or AI program. Again, as for all fields, the content may be embedded in this field, or the field may point to one of more files (or other locations, such as the audio or CC recorded with the program segment, or a web address) where the content may be located.

615 Audio and Video Start/End Cues—to supplement or replace begin (606) and end (607) record segment times (e.g. if edit times or ad content determined by the service on a network broadcast in one locale do not exactly match with the program as broadcast elsewhere) video frames or 'audio bytes' are supplied to indicated the bounds of the program material included in the segment.

616 Other Data as Needed—an almost limitless number of variations on, and additions to, the above will be implemented by individual practitioners, for any particular program and system.

Typical System Implementation:

FIG. 7 shows how such an abstracted program is, optionally, displayed via a settop box, an advanced, digital or HDTV television, or a multimedia computer display. The main video window, comparable to a standard television display is limited to a section (720) of the screen, generally of the same aspect ratio as the entire screen. Two other sections or windows are shown.

In window (710) a menu of buttons (711–716) and a message display/input window (717). This window is used, via some input device, such as a remote, mouse or keyboard, to control the operation of the display, and the management and navigation of the abstracted presentation. These functions may, optionally, be overlaid on the screen, as is common with VCR programming, videodisc and DVD control displays, etc. Optionally, the program window may go full screen when the other windows are not in use. Alternately, controls may be on a separate display or may not need to be displayed at all. For example, the 'level of abstraction' may simply be input from up and down arrows as are common on television remote devices for controlling volume or channel selection.

The (as shown, but not necessarily) foreshortened window (730) may optionally be used for additional controls, message input/display or for other reasons, including but not limited to: the display of indexes, tables of contents, headings, or other messages and information about the abstracted program in general, or individual segments; gaming or interactive controls and information; closed caption or other embedded text; embedded HTML or other information; or, the display of advertizements.

With regard to the last: many of the contemplated uses of the instant invention comprise excising material from television programs, including advertizements; and, it is contemplated that many users will desire to eliminate advertizements if possible. Consequently, there is an opportunity to reinsert advertizing in a, hopefully, less intrusive manner. Window (730) would contain, optionally, a ('squeezed', as is now common at the end of broadcasts, when showing credits of the previous program in tandem with an advertizement or 'promo') commercial that has been abstracted out of the current presentation; a still frame from such an ad; re-formatted counterparts to those ads designed specifically for this compressed window; banner advertizements from the worldwide web; or, banner ads or other advertizements supplied by the abstracting service. In any of these cases, the choice of advertizements that are (re)inserted is determined by some combination of: random choice; tied to the ad removed; determined by payments made by advertizers; and/or, determined by user specified profiles or other indication of user interests. When one of these displayed ads catches a viewer's interest, they will indicate, via operation of a remote or interactive control, and the abstracted program will pause. At that point, the full-screen version of the selected ad will be displayed. If it is an advertizement that has been removed from the main program during the abstraction process, it may simply then be displayed at its intended size and entirety. If the ad was not previously removed, an ad that has been grabbed previously from broadcast or cablecast, supplied by the abstracting service, secured from the internet, etc. will be shown. Alternately, or after the more standard ad is shown, if the viewer expresses interest, an extended advertisement, 'infomercial', worldwide website, interactive marketing material including electronic commerce mechanism, or other additional information will be made available prior to returning to the abstracted program. Alternately, that advertisement, or extended information (which, itself, is optionally arranged in a pyramidized fashion for presentation at multiple abstraction levels) can be marked and stored in a queue of material to review at a later time. Finally, when the program is paused, or the system is idle or not yet ready to display the requested material, advertizing material is, optionally, displayed.

Regarding expressing interest in advertising: a user profile will contain categories of interest in many areas. As one example, interest in automobile advertizing may consist of categories such as: anything to do with automobiles, including gasoline, repairs and automobile loans; limited to only advertizements for automobile purchase; limited, further, to a particular, brand (e.g., Cadillac, Mazda), country of origin (e.g., US only), type (e.g., SUV, sedans, sports cars) price range (e.g., luxury, economy), etc. To facilitate such selection, the settop box will reference closed caption data and categorizing keywords supplied by the abstracting service that are associated with each advertisement. Multiple profiles are, optionally, selected from, for individuals and groups from within a family. For example, with a family consisting of a mother, father, sons aged 18 and 7, and daughters aged 16 and 9, the following categories are offered: one each for each of six individuals; older two children; younger two children; two sons; two daughters; males (father and 1 or both sons); females (mother and one or two daughters); and, otherwise mixed or 'entire family' viewing.

FIG. 8 shows an illustrative, non-limiting, example display (800) from a settop box; advanced, digital or HDTV television; multimedia computer; or, other similar device. Window (810) contains on-screen, graphic, overall controls: buttons or icons (811–815) and a box (816) for systems messages and/or user input. Input devices (not shown) include television type remote controls, pointers, mice, keyboards, etc. Window (820) which is compressed vertically compared to standard video windows, would optionally display a compressed video signal, a website, a banner advertisement, or other media. There are two other full frame (that is, reduced size, but at the same aspect ratio as the full screen) video windows (830 & 850); and, an additional quarter-size window (840) that is further divided into four smaller full frame windows (841–844) used for previewing. Broadcast television graphic systems as well as consumer picture-in-picture offer such multiple video window features, and more recent advanced video and computer equipment offer even greater functionality and flexibility.

The multiple sub-window window (840) may be used to preview a number of inputs (e.g., simultaneous new broadcasts on ABC, CBS, NBC and PBS; several websites or other online material; a VCR, DVD, videodisc and videogame; several different abstracted versions of the instant invention; etc.) with the user having the ability to bring one of those into one of the fuller sized windows (830 or 850), or even the entire screen (800).

With two (830 & 850) or more full frame displays, several users can utilize the same display, so long as separate headphone outputs are provided, or the programs are silent or share audio (e.g., multiple camera views of the same sporting event simultaneously broadcast or available on recorded media). Alternately, a settop box, computer, multiple tuner receiver, etc. will, optionally, provide separate outputs representing major windows or displays, and these can each be routed to separate physical displays for use by several different parties.

FIG. 9A depicts a system diagram of internal components of a settop box, multimedia computer, advanced television or similar system suitable for practicing the instant invention (900). This system will have, at a minimum, one set of reception, recording and display components (910, 920, 930, 940 & 950), but will, in general, have a multiplicity of such components (911, 921, 931, 941 & 951), (912, 922, 932, 942 & 952) . . . (919, 929, 939, 949 & 959)—which implies an arbitrary number, not nine exactly—one for each simultaneously broadcast/cablecast/input channel to be recorded and/or displayed. The components numbered (91*x*) are television (or other media) receivers or tuners. These have inputs for a broadcast, cablecast or satellite (e.g., modulated radio frequency signals) antenna (a▶) for analog, digital, advanced or HDTV, etc. television (or other media) signals; and, inputs for baseband (b▶) video (or other media) of standard audio and video, S-video, digital video, 'firewire' (IEEE 1394), HDTV or other analog or digital signals from myriad media system components. The (91x) tuner/input components output (▶▶) media information to and exchange (◀▶) control information with components (92*x*) that process the video (media) information into storable form by digitization, compression or otherwise, as needed. The (92x) components output (▶▶) processed media information to and exchange (◀▶) control information with fast random access memory input buffer components (93*x*). The (93x) components output (▶▶) buffered information to and exchange (◀▶) control information with mass memory (e.g., magnetic or optical disk, etc.) storage components (94*x*). By using the components thus far (91x–94x), recordings of one or more signals, input at radio or baseband frequencies, is accomplished for each channel. For output and display, the mass memory storage components (94*x*) output (▶▶) stored information to and exchange (◀▶) control information with fast random access memory output buffer components (95*x*). Components (95*x*) output (▶▶) buffered information to and exchange (◀▶) control information with windowing display engine (960) which, in turn, outputs (▶▶) to display (970). Display engine (960) also outputs (▶▶) to external output jacks (965) supplying outputs (▶) of the entire display or individual windows; to one or more audio, video or media monitors; in video, S-video, digital video, firewire (IEEE 1394), HDTV, or other analog or digital media signal formats.

As is standard construction with such systems, if a signal is incoming, it may be displayed while recording, or instead of recording; or, one signal may be displayed while another is recorded. This is achieved, for example, by passing signals through, or bypassing, some combination of element (93*x*), (94*x*), and/or (95*x*).

Also, note that components (910–960) have inputs (▲i) from and outputs (o▼) to computer element (980); and, that computer element (980) has complementary outputs (▲o) to and inputs (i▼) from those components. Lines connecting these inputs and outputs have been eliminated for the sake of clarity. Computer element (980) itself comprises components including (but not necessarily limited to): a central processing unit (981); control, communications, organizing, database, graphic, media creation, media processing, media recognition, artificial intelligence and other information processing software (982); fast random access memory (983); fixed and/or removable mass storage, such as optical and/or magnetic disk or tape (984); input/output interfaces (985, wired electronic, infrared, radio, etc.) to external storage, output and input devices such as television type remotes, pointers, mice keyboards, etc (995); and, a modem, LAN, DSL or other communications interface (986) to an external communications network (e.g., a telephone or DSL line, a LAN, an ISP, the internet, etc.) and/or service (990). Note that, although computer (980) controls, synchronizes and coordinates most of the various other components, many of these components may contain their own embedded computer controllers.

FIG. 9B shows a second system diagram that differs only in that the output of each component (95*x*) outputs (▶▶) buffered information to, and exchanges (◀▶) control information with, a separate display engine (96*x*) which, in turn, output (▶▶) to separate displays (97*x*).

FIG. 9C shows a third system diagram that differs only in that the mass storage component (940), its input (930) and/or output (950) buffers comprise a single component (changes to all three shown) rather than one for each channel. In this case, frames from a multiplicity of input channels are either interleaved (discussed in greater depth below) for storage in a single file, or stored in separate files; similarly separate files or a single interleaved file feed multiple display channels. This variation of FIG. 9C is shown with the variation as in FIG. 9B, but can also be used in conjunction with the variation of FIG. 9A.

Interleaving of Frames and Segments:

Several illustrative, non-limiting examples follow, of interleaving, and 'emulsification', as described more fully in parent application Ser. No. 08/483,205. First, consider a receiving and recording system, such as in FIG. 9C, with four channels. During the network news period (generally 6:30–7PM, EST) the four tuners (910–913) are set to receive programs from ABC, CBS, NBC and CNN. The frames of these four programs are interleaved and recorded in a single file on disk (940) as shown in the first Table (1010) of FIG. 10. The programs are labeled A, B, C and D, and frames are numbered sequentially, starting at 0. When played back, as per FIG. 9C, via (940), (950), (960-3) and (970-3), by 'dis-interleaving' the signals, four separate programs are displayed on monitors; alternately combining variation shown in FIGS. 9B and 9C, the four programs are displayed in small windows (841–844) with any one selected for larger display in windows (830) or (850). In this manner, the four programs can be recorded on a single disk and/or in a single file, and are played back in synchronized manner. Auxiliary data, embedded within the video data, or separately provided, identifies which frames belong to which program streams. See applicant's patent EU 0144352 B1.

Similarly, an interleaved program may be broadcast, or pre-recorded and delivered on videotape, videodisc, DVD or otherwise, and dis-interleaved and displayed as described, directly above. Such an interleaved synchronized multi-source program is used, for example, for several camera views of a sporting event (e.g., from cameras placed at either football end zone showing overall action, and two 'roving' cameras showing close action) which can then be, simultaneously displayed (841–844), and/or selected for full display (800, 830 and/or 850) by the viewer interactively. Such a process in a broadcast situation would also reduce the number of field recorders required, and permit multi-camera editing at a later time from a single tape. Other such recordings, without limitation, include multiple camera shoots of stage plays (full stage, and close-ups of several actors), sitcoms and dramas, debates, newscasts (talking head and one or more informational streams), educational or training programs (with different levels of assistance), rated entertainment (with differently rated versions), or any of the multiply abstracted programs of the instant invention.

Again, referring to emulsification and weighting techniques previously disclosed in parent application Ser. No. 08/483,205, a program abstracted by the instant invention into four level—A, B, C and D—of lengths 5, 10 20 and 40 minutes respectively—would, optionally, be interleaved in a weighted fashion as shown in Table (1020) of FIG. 10 so that, in the most straightforward manner, the amount of material sent is proportional to the program length, and that the same percentage of each program is sent in a cyclic manner. Alternately, a more straightforward interleaving as shown in table (1010) would be used for all four programs until program A was finished, then the remaining three programs would be interleaved until program B was completed, then the remaining two programs would be interleaved until program C was completed and, finally, the remaining 20 minutes of program D would follow. Many variations to these rather simple schemes are optionally performed. For example, based on viewer specification, a viewer profile, a history of the viewer's past use of the system, or some content or AI analysis of the program, it is determined by the system that one of the programs is more likely than another to be selected. That program would be weighted more heavily. That is, the more likely a program is to be selected, the higher is the frequency of its frames in the interleaved structure. A program stream actually being selected by the viewer, and other criteria, are also reasons to increase its weight. If the program material is being downloaded, for example as streaming video over a network, rather than being local, on disk, then these variations on interleaving are potentially more important, to avoid interruption in program display.

Additionally, interleaving of larger segments than frames is useful when transmitting a program that has been abstracted at multiple levels as per the instant invention. With reference to the abstracted program script fragment depicted in FIG. 2, and the Tables (1110A continued in 1110B) in FIG. 11, the following (simplest and most straightforward) scheme will permit the shortest 'highlights' level 10 to be available, and to start displaying, in the shortest time possible (actually, for this first level transmitted, immediately); the next shortest 'trailer' level 9 to be available as soon after that as possible; the next shortest 'digest' level 8 to be available as soon after that as possible; and, so on. Note that, for the purposes of this non-limiting example, the 35 segments in FIG. 2 are assumed to comprise the entire program. The top row in each table (1111) is just a sequential index for clarity; the middle row (1112) is the order in which segments, as per (210), are transmitted; and, the bottom row (1113) is the level, as per (240), of each segment.

As useful as the preceding is, the following will provide additional utility, especially when information is being downloaded (e.g. via the internet or some other network, or via cable or broadcast in an offline, encrypted or non-visual manner) rather than broadcast; or being sent to a specialized custom or personal group, rather than to a large audience. If abstracted versions of a number of programs (e.g., a subset of prime time programs for several networks) are being delivered, the level 10 'highlights' of all programs are downloaded first, followed by the level 9s, etc. For a grouping of four programs (A, B, C and D) each with three levels (3, 2 and 1 in ascending order of length) and each level with two segments (X and Y), a non-limiting example is depicted in FIG. 12. Table (1210) shows the program (1211), level (1212), and segment (1213) for this straightforward scheme. Similarly for Tables (1220) and (1230). In Table (1210) the sequence is ordered by level (1212), segment (1213), and program (1211), which provides that all programs will have some material to view as soon as possible; in Table (1220) the sequence is ordered by level (1222), program (1221), and segment (1223), which provides that some low level program will be completed as soon as possible; in Table (1230) the sequence is ordered by program (1231), level (1232), and segment (1233), which provides that for some program all levels of abstraction will be available as soon as possible. Other orderings and variations, including weighting for length (FIG. 10), probability, importance, or other criteria can optionally be used. Also, see parent application Ser. No. 08/483,205.

For example, interleaving will, optionally, be modified so that the interleaved content will be more heavily weighted for the program currently being viewed. Alternately, viewer specification, a viewer profile, or viewer history (e.g., this particular viewer always watches the highlights (level 10) only of programs B and C, the digests (level 8) for programs A and E, and the entirety of program D) will be used to organize and weight interleaved delivery so that complete (if short) programs are delivered and stored first. For one example, the programs will be delivered in the groupings (with each grouping optionally interleaved):

1. level 10 of B and C;
2. level 10 for A, E and D;
3. level 9 for A, E and D;
4. level 8 for A, E and D;
5. level 7 through 1 for D;
6. level 7 through 1 for A and E;
7. level 9 through 1 for B and C.

After a sufficient amount of material is buffered, it can then be viewed while additional material is in the process of being downloaded.

As is disclosed in parent application Ser. No. 09/504,605, with certain bandwidth compression schemes, program (generally video) material is sent in several passes; and, it is possible to begin viewing material after the first pass at lower resolution, with progressively better resolution after each pass. This technique can be combined with the preceding techniques, for just one non-limiting example, in the following manner, as shown in Table (1240) of FIG. 12. Consider, this time, just three strictly telescoped abstracted program streams—short, medium and long—labeled A, B and C; assume a four pass bandwidth reduction algorithm delivering one quarter of the information at each pass. For a first pass material is sent in the straightforward order: the material of A, the additional material of B, and the further materials of C. However, in the next pass, materials are sent for A, followed by B. Then, a third and fourth pass are sent for A; followed by a third and fourth pass for B; and, finally, a second, third and fourth pass for C. By this multidimensional interleaving method, the viewer gets both: 1. some (at least low-resolution) version of the entire program relatively fast; and, 2. a full-resolution version of the shortest preview relatively fast. This principle is, optionally, combined with previous techniques for interleaving multiple levels for multiple programs. The above is particularly applicable when material is being downloaded via a digital network rather than being broadcast; or, being recorded from broadcast offline for later viewing. In those cases, material (at least for an individual pass) is, optionally, downloaded in a 'faster than real time' mode. However, if the material is being viewed while downloaded in multiple passes, the second or subsequent passes need only be (or, are preferentially) downloaded for the balance of program not yet viewed.

With a 'faster than real time' mode of transmission, for example, nine hours of prime time (e.g., three hours each for ABC, CBS and NBC; or a single source could provide nine hours of compressed 'prime time' programming) can be downloaded in three hours and recorded, without having to resort to multiple tuners to record what would otherwise be simultaneous programming. Alternately, with a single tuner, otherwise simultaneous programming can be recorded if some of the programming is rebroadcast in a delayed manner. With satellite dish reception, it is often possible to receive the same program multiple times as it is broadcast in several time zones or transmitted between networks and stations in instances not intended for home reception. Without dwelling on the legal (contractual and intellectual property) arrangements that would be necessary, it is also, optionally, a feature of the inventive service to send time compressed or time delayed copies of programming to affect reception and recording that would normally be impossible with a single tuner and regularly scheduled broadcasts. In this way, a single tuner system (or, each tuner of a multiple tuner system) would receive more prime time programming than three hours per reception channel in a given evening. Particularly if the auxiliary information is not yet available at the time of the original broadcast (either because it has not yet been generated, or for legal reasons) then delayed broadcast (optionally with the auxiliary information integrated within) becomes even more practicable. Additionally, in situations where narrowcasting or download on demand are modes of transmission, multiple previews are downloaded first and, after review and ordering, full abstracted programs are delivered. Alternately, the same programs are delivered on multiple channels, each offset by an amount less than the entire program, and each comprising a different pass of a reduced bandwidth scheme, as is descried in parent application Ser. No. 09/504,605.

Finally, for some embodiment, some segments may also be repeated. For example, a closing segment of a full program may also be included in a 'trailer' and, so, is optionally sent both early (to be able to view the trailer abstraction early) and again, at the end, in sequence.

Abstraction by Multiple Ratings:

One particular application for the instant invention is the transmission of a program that has been abstracted to conform to multiple rating standards, for example the MPAA's R, PG and G. There are, generally, relatively few sequences in a film that have to be changed for the more restricted ratings; and, particularly because of broadcast of theatrical films on television, scenes are sometimes reshot or reedited for several levels of ratings with one shown on cable and one shown on broadcast channels; occasionally, both are available for home video rental. With the instant invention, if a broadcast with alternative segments has been recorded off the air, or is pre-recorded and available ahead of time on disc or tape, the scheme in FIG. 4 can be used to assemble the appropriately rated version from alternatively shot sequences. Table (1310) in FIG. 13 shows a sequence (1311) of scenes of different ratings (1312) with start (1313) and end (1314) times. Table (1320) shows how alternative versions, rated G, PG and R, are abstracted from the program material. Note that in this embodiment, the alternative threads (segments 2, 3 and 4) and, thus, the entire program for each rating need not be the same length. Presumably, each of these alternative scenes has been shot or edited so that story continuity remains intact (even if more or less adult oriented) no matter which version is chosen.

Alternately, the 'chronological' scheme of FIGS. 1 through 3 is used as follows. Table (1330) of FIG. 13 shows an alternative embodiment that is implementable if alternate versions of the objectionable scene do not exist. It will still permit display of an entire program, limited for an appropriate audience; but, as objectionable material is progressively removed for progressively younger audiences, comprehension may suffer. A sequence (1331) of scenes (1332) with ratings (1333) are assigned codes (1334). Ratings G, PG and R are assigned codes 1, 2 and 3 respectively; however, the common scenes, also presumably rated G, are assigned code 0 to differentiate from sequences that are multiply threaded and, presumably, require intervention, based on the rating selected by the user. The entire sequence (scenes 1, 2, 3, 4 and 5) is the original, R-rated, program. When a level with a code 3 (or higher, e.g., 4, for NC17-rated material) is selected, all scenes are shown with the film intact. When the rating level is set to code 2 for PG, sequence 4, with code 3, is eliminated (i.e., skipped over) because the code exceeds the setting. However, in addition to removing adult material, a section of key dialog has also been removed, in as much as the director or producer has not provided a toned down alternative replacement segment. Comprehension may, thus, suffer for those viewing in PG mode. Similarly, if the rating level is set to code 1 for G, sequence 3 is also eliminated. Again, the program shown is limited to material appropriate to the audience, but comprehension may suffer even more, as two scenes with key dialog have been eliminated.

For the sake of simplicity, the previous discussion characterized ratings as being dependent only on age, but not on the type of objectionable material. However, MPAA ratings sometimes are listed with, and the TV Parental Guidelines generally include, the reason for the rating: e.g., sexual situations, nudity, language, violence, etc. Various religious and political themes are additional criteria for ratings. Therefore, it is a further intent of the instant invention that the ratings tags included as auxiliary information include one or more reasons for restricting a segment. In that way, parents are able to custom craft a rating scheme for their children that coincides with their values, opinions and sensibilities. For example, some parents feel that: the free expression of ideas is good, and mere words are harmless; a certain amount of sex material is permissible; but, almost any depiction of violence is unacceptable. In that case, they would program (e.g., via a screen menu and/or remote control) their ratings specification to set language at an 'R' level, sex at a 'PG' level, and violence at a 'G' level. Scenes would then be included/excluded at the appropriate level depending on the type of content tagged, generally with any single reason for exclusion being sufficient. Nevertheless, despite their beliefs about ideas and language, this theoretical family also excludes material pertaining to 'the death penalty', one of a (selectable on a rating menu) list of subjects that the inventive service additionally tags for this purpose. Exclusion by keywords and/or CC text is also used to blank material for subjects selected by the parent that are not on this list. However, this last is best used with material that has been previously recorded; otherwise, by the time key language is extracted from text, it may be too late to suppress the relevant scene.

The two previous schemes of FIG. 13 work well if the material has been previously recorded off air, as by the system of FIGS. 9A, 9B and 9C; or, if it is supplied on pre-recorded media. However, if those five scenes are transmitted in real time, any of the selections with the first scheme (1310 & 1320) will cause a blank out, for the two unselected scenes; and, the PG and G selections of the second scheme (1330) will blank out, for 1 and 2 scenes respectively. Nevertheless, this is vastly preferable to eliminating an entire program, because of a few inappropriate scenes, as is now practiced with the V-chip.

However, it is possible, with another embodiment of the instant invention, to broadcast a film in real time, yet for the viewer to be able to select and display alternately rated versions (or alternate versions abstracted for other criteria, or receive auxiliary information of any kind) without there appearing any blank segments. FIG. 14 shows how motion picture films, comprising 24 frames per second ("FPS"), are currently transmitted over NTSC interlaced video systems comprising 30 frames per second ("FPS") or 60 fields per second ("fPS"). The even fields marked "e" in (1404 & 1454) contain the even lines starting with 0; and, the odd fields marked "o" in (1404 & 1454) contain the odd lines starting with 1. These alternate, and a pair of odd and even fields, separated by a single line, comprise a frame, which are separated from each other by a double line and numbered (1403 & 1453). Since film comprises 24 FPS (lettered in upper case in 1401 & 1451) each film frame takes up the same amount of time as 2.5 video fields (or 1.25 video frames). And, since a video field is the smallest whole image in video, the 'half' field is achieved, on the average, by alternating: 2 video fields for one film frame; and, 3 video fields for the next. This scheme is known as '2-3-pull-down' and is shown by lower case letters (1402 & 1452) corresponding to the upper case film letters (1401 & 1451). Also, note that after four film frames (A through D), and five video frames (0 through 4), or 10 video fields, the film and video sequencing is realigned so that a film and video frame begin at the same time. This cycle is repeated again in FIG. 14 for film frames E through H.

Referring now specifically to diagram (1400) note that each video field contains unique information until (1411) which contains an even field (in video frame 2) of film frame B. But, two fields earlier (1421) the even field of video frame 1 contains the same material. Similarly, the odd field of video frame 4 (1412) contains odd lines derived from film frame D, as does the odd field of video frame 3 (1422). This pattern is repeated for the second half of diagram (1400) at (1413), (1423), (1414) and (1424). Thus, for each four film frames, or five video frames, or ten video fields, there is a pair of video fields, one odd and one even and, together, comprising one video frame, of redundant information. Since the system, of FIGS. 9A, 9B and 9C, contains mass and fast storage capable or storing, replicating and/or re-displaying information at appropriate times, the first occurrence of each piece of redundant information is transmitted, and for the second occurrence is repeated. In place of the second occurrence is sent information that is assembled in fast and/or mass storage to create the alternate segments that will be needed later. (Alternately, or in addition, this information is sent in VBIs of, generally prior, video frames; or, via other broadcast/cablecast channels, the internet or other network, etc.) In FIG. 14 one complete video frame (notated as 'x') of auxiliary information for alternate sequences is shown at (1461) for the even field, and at (1462) for the odd field. Similarly, a second complete video frame (notated as 'y') is shown at (1463) for the even field, and at (1464) for the odd field. Thus, while one version of the program is being received and viewed in real time, an additional 20% is being stored to accumulate material for alternative versions of later sequences. Thus, after viewing 10 minutes of common scenes, 2 minutes of additional material has been buffered. Thus, there is, at that point sufficient material so that a one minute segment may be viewed in any of three different ways: the default as broadcast; a first alternative segment consisting of half of the previously buffered material; and, a second alternative segment consisting of the other half of the previously buffered material. Each of these alternatives are, ideally, constructed and edited to be the same length; otherwise, some screen blanking, or loss of material, will, possibly, occur as the common segments are re-synchronized. Alternatively, because of the general nature of buffering program material that is inherent with the systems of FIGS. 9A, 9B and 9C, so long as sufficient material has been pre-loaded into the buffer, synchronization is not an issue. The pre-buffered material may be common material, or the alternative segments may be received and stored (in encrypted form, or while the screen is blanked, lest younger viewers see inappropriately rated material) prior to the start of the program. Pre-buffering of alternative sequences, transmission of that information as auxiliary information in the VBIs, and/or the scheme of FIG. 14 can be combined to effect the reception and desired display of generally alternately abstracted program material.

In contrast to the intent of the embodiment discussed above, the 'adult' material that is being replaced (particularly for cable or theatrical film programs) may be collected into a specialized 'adult highlight' abstraction level, as per the embodiments discussed above.

Since the auxiliary information comprising alternative segments (replacing redundant video fields, in the VBIs of earlier frames, or buffered prior to the formal 'start of program') will be resident in the system for a significant time prior to its use, there will be sufficient time to apply substantial, 'slower than real time' processing to uncompress it. Thus, this material is, optionally, compressed (perhaps severely) so that more alternative material than described, above, is available for the purposes described. See patent application Ser. No. 08/488,222.

User Interfaces with Particular Reference to News Programming:

Another major embodiment of the instant invention is particularly suitable for newscasts (network, local, public affairs, all news services, bulletins, news magazines, interviews etc.) and provides a way for the viewer to sort the personally relevant wheat from the chaff without having to spend hours doing so. News magazines, in particular, are 'fluffy'. That is, they have utility to the viewer based on a few, short morsels of information, although networks, advertisers and less discerning viewers may welcome the filling of a large block of time. These information tidbits are wrapped in recurrent 'previews', 'teasers' and 'bumpers' of the ilk, "Later in the broadcast, information you won't want to miss about . . . ". Further, the segments themselves tend to massage and repeat the same information over and over. Similarly for interviews, in public affairs and talk shows; they often contain a few interesting nuggets wrapped in fluff. Consequently, in addition to the particular technical details described in this section, the 'progressively abstracted summary' aspect of the invention (see discussion regarding FIGS. 1 through 6) is very useful to apply in combination with the techniques of this section. Nevertheless, this aspect of the invention is not stressed below, and is mentioned mostly with respect to (1511), (1572) and (1611). Rather, what is stressed here it that the invention provides indexing, and permits personalized abstraction and organization by subject, of news material. There are (at least) two ways that such material may be organized for access: indexed by subject within a program (FIG. 15) and collected by subject from multiple programs (FIG. 16).

FIG. 15 shows how the segments of a single news program are indexed so that the viewer may access only those stories of interest. The abstraction, indexing, keyword, heading, table of contents ("TOC"), graphic and other auxiliary information required is provided as per (340), (416), insertion into the VBI (or other portion of the signal not used for program material), particularly the VBI of earlier frames (see U.S. Pat. No. 6,025,882), by downloading a short segment of digital information embedded into the video (e.g., see FIG. 19) before starting the program, from another channel such as the internet, etc. The screen (1500) includes:

1501 a title bar with time and date.

1510 a first entry in a TOC of news segments from the abstracted program.

1511 a 'button' or 'icon' which will play an abstracted summary of the segment. Although not explicitly repeated, all playing will be in window (1569) or the full screen, as selected.

1512 a TOC entry showing the title for the segment, with index number.

1513 a 'type' field for the segment.

1514 a 'button' or 'icon' which will play 'teasers' (e.g., "Later in this hour we will bring you important information about . . . ") included in the newscast which are related to the story. These sometimes have images or information not included in the main story and, so, are included for completeness; but, usually, they are just redundant and annoying. So, they are made available as an option. For completeness, 'teasers' may be manufactured, by the inventive service, for segments that do not have them supplied.

1515 similar to (1514) but for 'recap' information, usually at the end of a broadcast. For completeness, 'recaps' may be manufactured, by the inventive service, for segments that do not have them supplied.

1520–1525 and 1530–1535 are comparable to elements 1510–1515, and correspond to the second . . . and Nth entry (of those that fit on the screen at one time) in the table of contents of news segments.

1560 a subwindow providing additional information about and controls for the selected segment. Segment 2 is selected in the figure, and this is indicated by the double line enclosing it.

1561 is a title bar repeating the TOC title information for the segment.

1562 a text box listing keywords (generated by a human or AI program, by analysis, reference to closed caption ("CC") text, or otherwise) associated with this segment. This listing can be scrolled if necessary by a scrollbar or other control (not shown).

1563 a textbox containing the text of the closed caption accompaniment to the video, if available, or generated by voice recognition, if possible, associated with this segment.

This text can be scrolled if necessary by a scrollbar or other control (not shown).

1564 a 'button' or 'icon' that will scroll the TOC (and/or the selected entry) up one entry, or one page; or, two buttons may be provided, one for each function.

1565 a 'button' or 'icon' that will bring up another screen, similar to that in FIG. 16, that will bring up a listing of related stories from other sources and/or other dates, based on keywords, or a list specifically embedded in the auxiliary information supplied for this entry.

1566 a 'button' or 'icon' that will play whatever is in window (1569) in the full screen, temporarily hiding control screen (1500) until the end of the segment, or until the 'stop' button is hit on the 'remote' or other control device.

1567 indicates other buttons, icons or 'widgets' that will be supplied by any particular practitioner, implementing any particular embodiment, for any particular hardware system, for any particular application.

1568 a 'button' or 'icon' that will scroll the TOC (and/or the selected entry) down one entry, or one page; or, two buttons may be provided, one for each function.

1569 a video subwindow, with graphic VCR style GUI controls, as is standard in multimedia computers and systems.

1570 a row of 'buttons' or 'icons' that control the screen in general, rather than the specific segment.

1571 a 'button' or 'icon' that will scroll the TOC (and/or the selected entry) up one entry, or one page; or, two buttons may be provided, one for each function.

1572 a 'button' or 'icon' that will play all the abstracted summaries, equivalent to 'scanning the headlines', as a way to help the viewer to decide which stories to view in greater depth. Although only two levels of abstraction ('summary' and 'full story') are shown here, buttons (1511), (1521), (1531) and (1572) can be extended with additional buttons, a dialog box or pulldown menu, permitting selection of one of many abstraction levels for summaries.

1573 a 'button' or 'icon' that will shift the screen from 'program index' to 'subject index' mode.

1574 a 'button' or 'icon' that will return the screen to a higher level or 'main menu' screen.

1575 see entry for 1567.

1576 a 'button' or 'icon' that will scroll the TOC (and/or the selected entry) down one entry, or one page; or, two buttons may be provided, one for each function.

FIG. 16 shows how the segments of multiple news programs are indexed by subject so that the viewer may access those stories of interest. The abstraction, indexing, keyword, heading, table of contents ("TOC"), graphic and other auxiliary information required is provided as per (340), (416), insertion into the VBI (or other portion of the signal not used for program material), particularly the VBI of earlier frames (see U.S. Pat. No. 6,025,882), by downloading a short segment of digital information embedded into the video (e.g., see FIG. 19) before starting the program, from another channel such as the internet, etc. The screen (1600) includes:

1601 a title bar, showing the chosen subject ("Microsoft Antitrust Decision") with date.

1610 a first entry in a TOC of news segments on the chosen subject.

1611 a 'button' or 'icon' which will play an abstracted summary of the segment. Although not explicitly repeated, all playing will be in window (1669) or the full screen, as selected.

1612 a TOC entry showing the source (e.g., network) for the segment.

1613 a TOC entry showing the start time the segment aired.

1614 a TOC entry showing the length of the segment.

1615 a TOC entry showing the title and/type of the segment.

1616 a 'button' or 'icon' which will play 'teasers' (e.g., "Later in this hour we will bring you important information about . . . ") included in the newscast which are related to the story. These sometimes have images or information not included in the main story and, so, are included for completeness; but, usually, they are just redundant and annoying. So, they are made available as an option.

1617 similar to (1616) but for 'recap' information, usually at the end of a broadcast.

1620–1627 and 1630–1637 are comparable to elements 1610–1617, and correspond to the second . . . and Nth entry (of those that fit on the screen at one time) in the table of contents of news segments.

1660 a subwindow providing additional information about and controls for the selected segment. Segment N (1630) is selected in the figure, and this is indicated by the double line enclosing it.

1661 is a title bar repeating the source and title/type information for the segment.

1662 a text window permitting entry, by the viewer, of a search string to search for, and bring up, a new group of program segments that meet the search criteria for subject. This is determined by either the computer in the local settop box, or is accomplished by a computer at the bureau providing the inventive service; standard and/or AI search engine technology is employed as is common for other services such as web search engines (see parent application Ser. No. 08/483,205). Matches are made between the search string and the keywords, CC text, TOC information, voice or video pattern recognition, or other information associated with each potential segment. Further, the search may be limited to those segments currently in the device (900); or, in addition, optionally contain other segments that are available (in video, compressed video, audio, text, etc.) to be downloaded from the inventive service via cable, satellite, internet, etc., or may just be listed in summary (but not available for download) for informational purposes; and/or, in addition, optionally contain other segments that are locally available (in video, compressed video, audio, text, etc.) from segments archived to mass removable media by the viewer. Other search limits (e.g., date, broadcast source, length, program type, segment type, media type, storage location, probability of correct hit, etc.) can be entered on a 'search option' menu, not shown, as is common practice with search engines.

1663 a pulldown menu of search categories, e.g. each a subject title associated with a group of keywords and/or other search criteria and limits. Default categories, optionally, are supplied by the service, and custom ones are assembled and stored (by use of a 'store button' or other menu, neither shown) by the viewer. These are used to initiate searches on a daily, or occasional, basis without having to reenter or reassemble the search criteria and limits. For example, a viewer-created category entitled "Technology Stocks" would search for simply 'technology' AND 'stocks'; or, more deftly, any of (Dow Jones, NASDAQ, NYSE, over the counter, stock market, etc.) AND any of (Microsoft, internet, computer, IBM, Cisco, technology, internet, telecommunications, MCI, AT&T, etc.); and may be limited to the last 7 days, and to items from ABC, CNN and PBS; and so on.

1664 a 'button' or 'icon' that will scroll the TOC (and/or the selected entry) up one entry, or one page; or, two buttons may be provided, one for each function.

1665 a 'button' or 'icon' that will bring up another screen, similar to that in FIG. 16, that will bring up a listing of stories related to the currently highlighted story from other sources and/or other dates, based on keywords, or a list specifically embedded in the auxiliary information supplied for this entry; e.g., a secondary search using some content of a particular selected segment.

1666 a 'button' or 'icon' that will play whatever is in window (1669) in the full screen, temporarily hiding control screen (1600) until the end of the segment, or until the 'stop' button is hit on the 'remote' or other control device.

1667 indicates other buttons, icons or 'widgets' that will be supplied by any particular practitioner, implementing any particular embodiment, for any particular hardware system, for any particular application.

1668 a 'button' or 'icon' that will scroll the TOC (and/or the selected entry) down one entry, or one page; or, two buttons may be provided, one for each function.

1669 a video subwindow, with graphic VCR style GUI controls, as is standard in multimedia computers and systems.

1670 a row of 'buttons' or 'icons' that control the screen in general, rather than the specific segment.

1671 a 'button' or 'icon' that will scroll the TOC (and/or the selected entry) up one entry, or one page; or, two buttons may be provided, one for each function.

1672 a 'button' or 'icon' that will play all the abstracted summaries, equivalent to 'scanning the headlines', as a way to help the viewer to decide which stories to view in greater depth. Although only two levels of abstraction ('summary' and 'full story') are shown here, buttons (1611), (1621), (1631) and (1672) can be extended with additional buttons, a dialog box or pulldown menu, permitting selection of one of many abstraction levels for summaries.

1673 a 'button' or 'icon' that will shift the screen from 'subject index' to 'program index' mode.

1674 a 'button' or 'icon' that will return the screen to a higher level or 'main menu' screen.

1675 indicates other buttons, icons or 'widgets' that will be supplied by any particular practitioner, implementing any particular embodiment, for any particular hardware system, for any particular application.

1676 a 'button' or 'icon' that will scroll the TOC (and/or the selected entry) down one entry, or one page; or, two buttons may be provided, one for each function.

Additionally, segments may be selected based on other criteria such as length, type (e.g., interview, special report, update, feature, general news, etc.) and these are determined by review by a human and/or an artificial intelligence program, as is discussed in more detail below. Further, segments may be ordered by 'importance' base on criteria such as: viewer subject interest profile, marking by the service as such, status a an 'update' or 'special bulletin', etc.

Before leaving a discussion of news programming, a related (e.g., a non-fiction area where immediacy is an important element) will be discussed, that of sports. Coverage of sports highlights in news broadcasts is standard. In addition to the techniques discussed herein for news, drama comedy and entertainment, there are some additional considerations. The idea of avoiding spoilers is particularly important in creating alternate versions of highlight summaries that show how situations set up (non-spoiler) and how they resolve (spoiler). Additional personal preference abstraction criteria include: which team (league) do you root for; are you an experienced fan or newcomer; which player(s) are you particularly interested in; (how much) do you want the commentary vs. just the action; etc. Further, with regard to searching by subject, of for related segments, sports are rife with statistics. These may be used (same team, same player, same match-up, same situation, different time periods, etc.) to conduct such searches for previous or archived material. These (and all) searches may be done in the home system; but, they may also be done, and generally with much greater compute and data resources, by a computer at the inventive service either at the request of a viewer (in much the same way that WWW searches are initiated), or as on its own initiative in the nature of 'commentary'.

The above examples (the discussion with FIGS. 15 and 16), as are all in this application, are exemplary rather than limiting. Multimedia, user interface, database searching and accessing (e.g., see parent application Ser. No. 08/483,205), and related technologies, are well developed and well understood in standard practice, and within the ken of those skilled in the appropriate arts. In and of themselves, generally, they are not the subject of the instant invention. Rather, the purposes to which they are put, organizations, and other details disclosed are what will be claimed. Further, explanatory examples have been made for various technological details with respect to particular applications, e.g.: the basic concept of abstraction (see Ser. No. 08/483,205) and inclusion of auxiliary information (see U.S. Pat. No. 6,025,882), with the application to, more or less strictly, telescoped summaries; frame and segment interleaving (see Patent EU 0144352 B1) with the application to programs abstracted for multiple ratings; the user interfaces with respect to news programs; and, more application examples will be made below with regard to human/computer collaboration and artificial intelligence (see Ser. No. 07/951,267) and other technologies. These pairings are not mandatory. Rather, all of the techniques, systems, organizations, and other details disclosed are applied, singly or in combination, as appropriate, useful and needed, to any application for 'multiply abstracted and labeled program material', as described herein, or as will be developed in the future; and, may be combined with, or substituted by, any related technologies now in existence or later developed.

Decollating Multiply Threaded Programs:

Next, another application for abstracted programs with tagged segments will be described. The underlying technology is, essentially, with minor adaption or variation within the ken of those skilled in the appropriate arts, the same as described above. What is focussed on in this section are the further functional and organizational specifications needed to implement these particular techniques.

The archetypal program to consider for this application is the daytime serial or 'soap opera'. These melodramas, generally programmed for an hour a day, five days a week, often live, interleave a number of ongoing storylines. At any given time, various stories are starting, developing, twisting, climaxing, wrapping up, pausing, receding, or resurfacing. The characters interact and the storylines often intersect and impinge on each other. In terms of narrative, the several storylines on any given day are broken up into small scenes and these are interleaved with each other and interspersed with commercial interruptions. Further, these programs are structured so that missing any given day will not make the stories incomprehensible so that, on any give day for a particular storyline: events from a few days ago are reviewed (e.g., by recounting them to a character who was not present); more recent events are repeated (e.g., by picking up yesterday's conversation between two characters at an earlier point, or in a repetitious manner); and subsequent events are foreshadowed (e.g., by speculative conversations, expressed fears or threats).

Such practices are advantageous to programmers wanting to fill airtime; to advertizers wishing to draw viewers eager for new tidbits of narrative; and, to stay-at-home viewers wishing to fill lonely periods. However, there are others, busy with career and household obligations, for whom regular attentive viewing is not practicable. That most VCRs are provided with a single command to record programs at the same time, on the same channel, Monday through Friday, evidences this. However, especially if following several such programs, having, at the end of a day or week, several or many hours of tape to review is a daunting task, even with the help of the fast forward function. This is particularly so if the viewer is interested in following only some of the storylines.

Although the foregoing has focused specifically on soap operas, the same principles are applicable to many prime time dramas, particularly medical, legal, police and 'life' dramas produced by MTM, Steven Bochco, David Kelly, etc.; and, even to some primarily action-adventure programs involving vampires, FBI agents, aliens, ancient mythical figures and warrior princesses. Other programs, primarily actioners and sitcoms, tend to involve, almost exclusively, self-contained episodes. However, even for sitcoms, for example, within a single episode several storylines have progressive segments interleaved (e.g., often, running gags intermittently progress through an episode); and, in the best such scripts, these are intertwined and converge in a climactic event and scene. While such pacing, complexities and other narrative niceties will, undoubtedly, be diminished by the practice of the embodiments to be described, following, there are other elements that save time, and increase efficiency, satisfaction and control, and which will be utile to many viewers.

FIG. 17 shows yet another, exemplary, non-limiting user interface refined for accessing this kind of program material. The screen (1700) includes:

1701 a title bar, showing mode (storyline access) and show title and network.

1710 a first entry in a TOC of storylines of the chosen program.

1711 a pulldown menu selecting the 'summary level' for abstraction of segments included in the instant story line. For this application an appropriate five levels would, for example, include: complete (all scenes); condensed (all events, with redundant scenes and dialog removed); essential (major events depicted); digest (summary of full story); highlights (most striking scenes only).

1712 a pulldown menu permitting selection of a time period within which to select scenes. These would, for example, include: 1–5 days; 1–4 weeks; 1–12 months; 1–5 years; always; custom (which would bring up another more detailed screen permitting entry of dates, events, keywords, characters, and non-continuous periods to limit the selection, etc. Based on the rate of increase in PC mass storage, and with 30 hours of video storage (94*x*) in the current crop of 'easy record & special effects' settop boxes, hundreds of hours are not far off; and, removable optical storage (984) or storage to external devices (via 965 and/or 985 to 995) will permit that to be increased arbitrarily. Thus, at the end of a day, week or month, viewers will offload and add a substantial amount of programming to a personal archive or library for various shows or subjects. These are, in turn, selectively reloaded by the system for abstracting from segments originally aired over extended periods. Further, missing segments are requested for uploading by the system (e.g., via 986/990) from the abstracting service or program provider.

1713 a pulldown menu with two options to include or exclude scenes of the instant storyline; included storylines are highlighted by a double line in this example.

1714 a description of the instant story line.

1720 –1724, 1730–1734 and 1740–1744 are comparable to elements 1710–1714, and correspond to the second, third . . . and Nth entry (of those that fit on the screen at one time) in the table of contents of storylines.

1770 a row of 'buttons' or 'icons' that control the screen in general, rather than the specific segment.

1771 a 'button' or 'icon' that will scroll the TOC (and/or the selected entry) up one entry, or one page; or, two buttons may be provided, one for each function.

1772 a 'button' or 'icon' that will play abstracted summaries (at a chosen level) for all (or only those selected) storylines for the last day, or week, or whatever is available in the mass storage of the system.

1773 a 'button' or 'icon' that will shift the screen to an 'advanced' mode offering other options (e.g., as provided in other search engines, and as described in (1712), and beyond) for crafting a personalized abstraction algorithm. For example: all scenes in the last two weeks where the characters 'Bart' and 'Vallerie' were both present; or, all scenes more than a month ago mentioning the 'failure of Bart's business'; or, all scenes in the last year with 'action' involving 'telephone conversations'; or, all scenes listed as comprising material about both the storylines 'Jim and Jane's Relationship' and 'Sam Dropping Out of School'. See, also, discussion regarding FIG. 18.

1774 a 'button' or 'icon' that will return the screen to a higher level or 'main menu' screen.

1775 indicates other buttons, icons or 'widgets' that will be supplied by any particular practitioner, implementing any particular embodiment, for any particular hardware system, for any particular application.

1776 a 'button' or 'icon' that will scroll the TOC (and/or the selected entry) down one entry, or one page; or, two buttons may be provided, one for each function.

By designating a personal selection of storylines, time periods covered, and levels of abstraction, from a menu similar to that described immediately above, the viewer creates a custom version of the program broadcast on a particular day, or for an extended period, limited to the subject and scope of material that interests them. Although the entries are for storyline, other ways to characterize program segments include subject(s) discussed, subject(s) discussed, character(s) present, character(s) mentioned, action(s), a particular character's point of view (e.g., show only what they are/have been/will be aware of), time periods, etc. Also, see the discussion, below, regarding segment searching and FIG. 18.

Further, although not specifically shown in FIG. 17, subjects may be combined in union or intersection. For example, with regard to subjects (1710) and (1720): choice of (1710) alone will display segments regarding 'John and Mary's Marriage'; choice of (1720) alone will display segments regarding 'John and Jane's Affair'; choice of the union of those two subjects will display segments that pertain to one, or the other, or both of those subjects; and, perhaps most interesting, choice of the intersection of those two subjects will display segments that pertain to both subjects simultaneously—for example, a scene where Mary threatens to leave John unless John end his affair with Jane—or, a scene where Jane threatens to end their affair unless John divorces Mary.

Another selection of summary or abstraction type not specifically shown is 'fan' vs. 'neophyte'. That is, many scenes in a program are intended to let the viewer know who a character is (i.e., character development) or provide other background material. Even for programs that have been broadcast for many seasons, this type of material is included for new viewers. However, for long-standing viewers, this material is not necessary. Thus, having the service mark background material as such, will permit a view to declare themselves an experienced fan, and have additional unnecessary material removed to further condense the viewing experience. Viewer experience may be specified by simple statement made by the viewer such as: very/moderately/not experienced; view regularly/occasionally/never; or, have been a viewer since (fill in date).

FIG. 18, shows a non-limiting example of a data file (1800) for a program scene, for use with the embodiment described, above. Fields shown include:

1801 title of the program from which the segment was taken.

1802 source of that program (distribution shown, but may also include production source).

1803 date and time aired.

1804 length of segment in hh:mm:ss:ff.

1805 characters present.

1806 characters mentioned.

1807 subjects mentioned.

1808 storyline(s) involved.

1809 other keywords (entered by human reviewer and/or extracted from (1810) by AI.

1810 text of dialog from closed caption channel, human transcription, or voice recognition software.

1811 actions—generated by same techniques as 1809.

1812 abstraction script—this is a pointer to a file such as in FIGS. 2 through 6.

1813 current location—pointer to (in this case) a removable mass storage disc on which the viewer has stored the segment (or the abstracted or complete program containing the segment). Other locations would include: in the fast storage of, or on the mass storage mounted on, the system; only available by downloading; etc.

Elements (1805) through (1811) are particularly important with regard to the search features discussed in the context of elements (1662), (1663) and (1773); or, for other indexing, search and AI functions described herein. In addition to searching based on user supplied keywords or other criteria, a viewer may request a list of 'similar segments' based on content and description. Worldwide search engines routinely have similar mechanisms, and parent application Ser. No. 08/483,205 discloses additional intelligent search and match techniques. For example:

a scene with several exact matches (e.g., same characters, discussing by telephone—the mode in the example, the same subject) would be labeled as having a very high degree of similarity;

a scene with a single exact match (same characters, discussing in person, a different subject; or, different characters, discussing the same subject) would be labeled as having a moderate degree of similarity;

also, several similar, but not exact, matches (e.g. one of two characters the same, discussing a related topic) would be labeled as having a moderate degree of similarity;

and, no exact and a low number of similar matches (e.g., same two characters, but several other characters as well; discussions of related topics by other characters) would be labeled as having a low degree of similarity.

An adjustable limit (say 10 by default) on the number of 'matches', ordered by similarity, returned, would ensure that only highly similar matches would be returned, unless there were no highly similar matches, in which case the most similar matches would be returned.

Further, as will be discussed in more detail below, recent techniques, including those combining pattern recognition with artificial intelligence, expert systems and, especially, neural networks and fuzzy logic, are also applied to search and match on video sequences on the basis of visual match information.

Note that, although discussed in this section of the disclosure, these techniques apply (perhaps, even more so) to news and other types of programming as well.

Storing Auxiliary Information with Video Program Material:

Regarding the archived storage of video and auxiliary information, there are several possibilities, among these are:

if the auxiliary information is stored in the VBI, or elsewhere in the video signal, they may be stored together on removable mass storage (984) or to external storage devices (995) via (985), or to external video devices via (965).

the digital or digitized video signal may be stored with the associated digital auxiliary information in the same file, or in two associated files; on removable mass storage (984) or to external storage devices (995) via (985).

the auxiliary information may be made into an analog (or digital) video picture (as per FIG. 19) and stored, with the associated video information or in two separate segments, on a video recording device (995) via (985) and/or any device via (965).

FIG. 19 shows how digital information, a string of ones and zeros, has been converted into black (■) and white ( ) dots and formed into a small section of a video image frame. So long as the method of conversion is known and reversed, the digital file is reconstructed when the video signal is re-entered via (965) if made bi-directional, which is standard practice, but not shown; or, via (91x). In order to make inherently noisy video systems more reliable for such purposes, the information is recorded redundantly. This is accomplished by repeating the information as a direct copy, 1s complement, or in an encoded version. The duplicate may be accomplished by: repeating the segments of data in an adjacent pixel, line, field, or frame; or a later but not adjacent pixel, line, field, or frame. Parity, linear, cyclic or other redundancy information is embedded within the image field, and may detect and/or correct one or more errors per line, column, frame, field, time line along one pixel, etc. The art of encoding and decoding digital data into a video frame, optionally with redundancy data and error detection and correction, is well developed and well known to those skilled in the arts. In particular, the reader is also directed to parent application Ser. No. 07/800,325.

Visual Ellipsis:

One additional feature of the instant invention, when presenting abstracted (summarized) material is the incorporation of a 'visual (or auditory) ellipsis' to indicate when material has been excised. A brief fade to black is an obvious candidate but, since it is already used as a narrative cue in complete film and television programming, its additional use for this purpose would be confusing. Thus, it is suggested that a fade to/from some other color (white is also already, although less often used) or some graphic (but, nothing so obvious as a scissors or clock), an overlay, or an unobtrusive auditory chime of some sort be used. In as much as such a device could be as annoying as helpful, it is further suggested that such cues be optionally inserted by the system, or not, at the viewer's request, rather than being permanently embedded into the program.

Preparing Program and Auxiliary Information:

FIG. 20 show a system (2000) for organizing and preparing the program material and auxiliary information for the instant invention. Such systems are widely available, and their design, construction and operation are well known and well understood by those skilled in the art. Both professional and personal systems abound and examples include the Avid, and recent multimedia PCs from Apple, Sony and IBM-compatible suppliers, etc. Typically, such systems include, without limitation, the following components:

2010 media sources, including: radio broadcast, cablecast, satellite broadcast, communications network, physical media, etc.; Tape, disk, etc.; Digital, analog, magnetic, optical, etc.; Video, audio, hdtv, digital television, graphic, image, sap, vbi, closed caption, text, html, keyword, multimedia, interactive, etc. Although only one box is shown, there are, generally, a multiplicity of sources in such systems.

2021 signal inputs from (2010).

2022 signal outputs to (2010).

20263 control inputs from (2010).

2024 control outputs to (2010).

2025 main computer.

2051 central processing unit: may be multiple, and individual components may also have embedded controllers separate from this element.

2052 fast memory: generally RAM (and/or ROM, PROM, etc.) and optionally include general storage, scratchpad memory, specialized registers, specialized input and output buffers including display buffers and compression/decompression buffers, etc.

2053 mass storage: optical, magnetic, etc.; tape, disk, etc.; fixed, removable, etc.

2054 software and data residing in (2052) and (2053) and registers of (2051). Includes: original, edited, processed, compressed, uncompressed, encrypted, decrypted, etc., versions of the media and auxiliary information. Includes software for: control; encryption/decryption; compression/decompression; editing, processing, conversion, integration, analysis, and recognition of media including audio, video, image, graphic, animation, text, etc.; artificial intelligence including expert systems and neural networks; etc.

- 2055 bi-directional media interfaces to (2010): provides inputs and outputs for both signal and control; although only one shown, generally, there will be multiple interfaces for multiple devices; includes analog, digital, television, audio, firewire, parallel, serial, USB, electronic, radio, infrared, etc., interface technologies.
- 2056 bi-directional peripheral interfaces to (2090): provides inputs and outputs for both signal and control; although only one shown, generally, there will be multiple interfaces for multiple devices; includes analog, digital, television, audio, firewire, parallel, serial, USB, electronic, radio, infrared, etc., interface technologies.
- 2061 signal outputs to (2090).
- 2062 signal inputs from (2090).
- 2063 control outputs to (2090).
- 2064 control inputs from (2090).
- 2090 peripheral devices, collectively. Although only one box is shown, there are, generally, a multiplicity of peripherals in such systems.
- 2091 menu monitor peripheral devices.
- 2092 media monitor peripheral devices; audio, video, image, text, etc.
- 2093 keyboard peripheral device.
- 2094 data tablet, mouse, joysticks, knobs and other mechanical peripheral devices.
- 2095 mass storage peripheral devices: disk, tape, analog, digital, optical, magnetic, fixed, removable, etc.
- 2096 hard copy peripheral devices including cameras, printers, etc.
- 2097 communications network interface peripheral devices including, LANs, modems, DSL, internet, etc.
- 2098 other peripheral devices as needed.

FIG. 21 depicts the basic abstraction process for general program material. For specialized material, e.g. news or sports, the process will be optimized. For example, generally, straight news programs do not interleave their various stories (except for 'teasers') and so the decollation step will be entirely or largely eliminated, or may be entirely automated. The overall process will be carried out on large amounts of material and, generally, will be done in very short order. Consequently, it is imperative that as much as practicable 'computer assist' of the process to be utilized. Parent application Ser. No. 07/951,267 suggests some ways that a computer may 'look over the shoulder' of an operator doing image editing and learn from analyzing the operator's actions on one segment or frame, and apply that analysis to perform (at least a first cut ready for operator confirmation, if not a finished task) a similar action on later material. Here, for example, AI learning may include: how a particular editor needs to have their edits 'trimmed', depending upon the type of edit; or how the editing details of a particular program operate (how fast are fades, do the audio beds extend beyond the fade, etc.); what bumper audio and/or video may be relied upon to signal commercial breaks; etc. There are also a number of published techniques for: automated or semi-automated segmentation of video streams, based on visual analysis including neural net recognition of visual features, and on analysis of sound, voice or other data; automated face recognition (which can also be applied to automated recognition of location or stage sets); and, automated identification of actors (again applicable to sets and other dramatic features). The instant invention relies on these and other techniques for basic enabling technology. An outline of the steps in analyzing and organizing program material, creating auxiliary information, and delivering that auxiliary information is outlined in the information flow chart of FIG. 21, which includes the following steps:

- 2101 An AI program makes a preliminary attempt at segmentation of the program into shots and/or scenes, removes (or, at least isolates) commercials, etc. A human collaborator may participate in this process adjusting edit boundaries suggested by the system. The AI system, in turn, once corrected will, optionally, refine the exact frame boundary of the edit. appropriateness of the segmentation and corrects where necessary (again with an optional AI fine tuning).
- 2103 An AI program (generally not the same one) makes a preliminary attempt at decollation of the program into separate storylines or other relevant information streams. Again, a human collaborator may, interactively, participate in this sorting process. Since this process generally requires more judgement, the amount of human participation will be greater. For either AI or human, analysis of the dialog (or CC text) will play an important part in identifying which stream(s) a segment belongs to. This process will, in fact, sometime feed back to the prior step in that what appears to be a single segment, based on primarily visual criteria, can turn out to be two separate segments based on subject matter content analysis. Thus, the segmentation process (2101, 2102) and the decollation process (2103, 2104) are largely separate, perhaps carried out by different operators and programs at different times; or, they are, optionally, integrated into a composite process yielding segmented and classified shots and scenes.
- 2104 Again, to whatever extent step (2103) is automated rather than collaborative, a human confirms the appropriateness of the decollation and segment classification process.
- 2105 This step requires even more 'creative' judgement so, for the foreseeable future, will most likely be a task done by human effort with an, optional, AI assist. Thus, it has not been depicted as two steps as for previous steps. However, as AI advances develop and such abstracting judgements become more, or entirely, automatable a two step (AI preliminary, followed by human confirmation) or even entirely AI step is considered to be within the scope of the instant invention. Nevertheless, even if entirely performed with human judgement, the process as envisioned is highly automated with advanced video editing tools that show the work for review at progressive stages of completion, showing the various abstracted alternatives to the operator. The step involves 'thinning' (or otherwise organizing) each information stream into progressively summarized or abstracted edits of the decollated information stream. The edits made at this point need not be on the boundaries of the earlier segmentation process. The process is entirely 'telescoped', only removing material at each progressive level; or, optionally, some material removed at one level may re-appear at a lower level. Similarly, the material (although decollated and, thus, ignoring the removed intervening material) is kept in entirely chronological order; or, optionally, for narrative purposes, license may be taken to re-sequence some material for some abstractions.
- 2106 Optionally, the various narrative or informational streams, are re-collated, at each level of abstraction, so that some version of the original interleaved narrative structure is regained at each level of abstraction. This may involve physically reediting multiple abstractions of the material; but, more likely, involves integration of multiple edit lists from each narrative stream, at each level of abstraction.

2107 Optionally the program and auxiliary information are integrated (e.g., inserting auxiliary information into the VBI of a current, or prior, frame); alternately, they are kept separate.

2108 Auxiliary information is distributed to be (recorded and) utilized with the program material in the settop box, or other system; or, if step (2107) is performed the integrated material is distributed.

It is suggested that if human abstractors were to edit various summaries of television programs from the entire original, they might make different creative decisions, and that method of production is an alternative embodiment. However, the above procedure of decollating, thinning, and re-collating is efficient.

Regarding automatic segmentation, one of the most often performed, and most likely to be most nearly completely automatable functions, is the separation of program material from commercials. If closed caption text is available, this is the most straightforward element of a television signal to utilize; however, it is not necessarily available and, particularly when there is no dialog, may be empty. Voice recognition or audio analysis is not as straightforward, but the volume of data is significantly less than video image analysis, even if the computation techniques are not necessarily less complex. Analysis of moving video sequences for pattern recognition (e.g., recognition of faces, actors, sets, etc.) is compute intensive, but there are techniques involving AI, neural networks, etc. that are very useful in this area.

One note regarding face/actor recognition. At a time when Seinfeld, was very popular, Jerry Seinfeld was also often seen in American Express commercials; so, face recognition is not fool proof. Other criteria e.g.: if this segment is 30 seconds and between two other advertizements it is probably an advertizement; if the words "American Express" show up; or, if the locations are not familiar; will assist in this automated determination.

In any event, the nature of program material vs. advertizements is as follows and (whatever signal is being analyzed, text, audio or video) is the key to successful automation of the process:

program material contains familiar and expected elements (faces, voices, actors, word clusters, sets, music, etc.) although the specific content is new and never before seen;

on the other hand, no particular commercial is expected, although it almost certainly has been seen in exactly the form before. That is, the chance of seeing a commercial for the very first time is vanishingly small.

Generally fades separate commercials from program material and from each other. And, bumpers—short graphic, often still, images with music, separating the show proper from the commercial break, sometimes also repeated in the midst of a long commercial break—are incorporated into most television programs. It is also acknowledged that fades are sometimes used within the program for dramatic or narrative purposes.

Nevertheless, looking for quick fades to and from black as separators is a first step. The material on the near side of the fade is presumably program material, and this is confirmed by AI analysis of the CC text, if available, looking for known character names and other words known to occur with high frequency in the particular program; and, by AI analysis of sound for recognition of known voice frequency spectrums or musical beds; and, by having an AI program look for known faces, sets, other objects, and even lighting and camera style. All these elements, particularly the visual and audio recognition, are amenable to neural network programming. By 'training' such programs on large doses of prior programming of the same type, they can learn to recognize faces, etc. A large number of such programs (or subprograms) would be trained on different faces, actors, sets, etc. and one or more would recognize some expected element in the television program, although the particular scene has not been broadcast before. If no familiar element can be recognized automatically, the segment is subjected to the commercial segment search, as described, below, and, if that fails (or instead) human intervention is requested by showing the segment in question to an operator for classification by human judgement.

In contrast, confirming a commercial segment is different. In a television program's segments there are a relatively small number of items to be considered, but they are approximations, not in exactly the same position of circumstance as seen previously. With commercial segments, the segment has exactly been seen before, but there are a very large population of advertizements. Therefore, rather than relying on neural networks, or fuzzy logic and similar AI techniques; commercials can be identified and confirmed by making exact matches. Text searching is relatively easy if the advertizement has CC text and a sample of that is on file. But if sound and, especially, video is to be relied upon, the amount of computation needed, to see if a particular 30 seconds of advertizing video matches any one of thousands of advertizements on file, is immense. Also, noise and other small signal variations make such matches inexact, and the amount of computation to see if something is 'close enough' is even larger than making an exact match. Further, matching against a large number of items is hard to accomplish if blindly trying one after another; on the average half of the possibilities will have to be eliminated before the correct one is found. These problems are addressed as follows.

The advertizement is reduced to a small representational amount of information. This is done in any one (or more) of several ways, by illustrative non-limiting examples:

Limit Data to Subset—a small subset (perhaps a window just a few pixels square; perhaps a small group of pixels disjoint in space and/or time; perhaps the first, middle and last frame of the segment) of the segment is focussed upon; this may be the same subset for all advertizements, and this reduces the amount of data to be compared to a manageable amount.

Extract Features—alternately, the segment may be analyzed by some criteria (e.g., where most geometric change or temporal activity is happening) to find the 'most interesting' area (in time or space) to analyze. So long as the same algorithm decides 'what is most interesting' the results of this analysis is, itself, a strongly unique feature that helps identify the segment as a previously seen and similarly analyzed segment. That is to say, for example, if it is found that, for this particular 30 second spot: 'a 20×20 pixel window starting at coordinate (102, 97), during frames 610–620, is the most variable section brick of X/Y/time data'. These features can be compared, in a multi-dimensional 'feature space', (e.g., the location and size, in time and space, of this most active window are the features) with the results of similar analysis of very many other commercials. These results have been stored in that same space, and only those commercials whose analyses are nearby in feature space need be compared more fully, in a computationally expensive manner, with the segment in question. Because such spaces can be accessed by location within the space, the entire space need not be searched, only the neighborhood near the data in question. There are many other features that can be extracted from the video (or audio) for such feature space searching. Just a few examples include: an analysis of where and when large contiguously-colored areas or shapes occur, and a brief characterization of what they look like; a profile of features (e.g., peaks an valleys) of a plot of average, or a small geometric sample of, brightness or color (or loudness) vs. time; or, any of many 'hashing algorithms' appropriate to sound or image data may be applied to arbitrarily assign advertizements to a list.

Reduce Resolution—a technique that combines features of the foregoing, and also provides significant noise immunity, is to reduce the resolution of the (generally video) data. Consider splitting the screen into equal rectangle that are ⅕th of the screen in both directions, then, within each ½₅th of the screen average all the pixel data together. The result is a twenty-five pixel image. Optionally, reduce the color-space resolution to 2 or three bits in each signal component (R/G/B or I/Y/Q, etc.). Further, optionally, average these images over a number of frames and/or sample only every Nth frame (e.g. to reduce a 30 second spot to 30, or even 5, frames). In combination, a five-frame window may be averaged, but spaced at 60 frames to reduce temporal 'blurring' compared to averaging all 30 frames. The resulting 5 H(orizontal pixels)×5 V(ertical pixels)×15 T(emporal frames)×6-bit C(olor) data is vastly reduced, greatly shortening the amount of compute power needed to compare the segment in question with any potential match; yet, the particular representation for any advertizement will be nearly unique, and is storable in a feature space or other associative memory structure that will permit the number of candidates to be reduced to one or a few. If there are too many candidates, the same procedure may be performed at a higher resolution (candidate advertizements having been processed previously at several such resolutions) where more discrimination in feature space is possible. Once one, or a few, candidate segments have been identified, they are compared more fully. Generally, such segments are compared by techniques of correlation or convolution where the two signals are overlaid and compared pixel per pixel. The signals are then offset with respect to each other (in X, Y and/or T) until a match is made, or the process is abandoned. This is necessary because, for example, two checkerboards that match everywhere when aligned, will match nowhere when offset by a single pixel. This highlights a great advantage of the technique described in this section. Many types of signal distortion or noise will be eliminated by the windowing, averaging and/or color-space precision techniques; all ways of lowering resolution. Each ½₅th of the screen will contain approximately 150 by 96 (14,400) pixels averaged together. If the signal is offset by a pixel or two in any direction the average will be little affected, especially with less color value precision. Similarly, with 5 or 10 or 30 frames averaged over time, a small time offset will also not greatly affect the result. Further, the type of (especially) stocastic noise, or non-random noise like ghosts, that plague video will also, generally be lost or reduced during the averaging process. Nevertheless, prior to, or after, the averaging process, the following will reduce a type of signal distortion that is not much reduced by averaging. Television (especially analog) signals can suffer from offset or gain distortion; and these will affect all pixels and, thus, the average similarly. Consequently, either the original high-resolution data, and/or the low-resolution, can be 'stretched' between maximum and minimum acceptable values to compensate for brightness and contrast distortion. Small numbers of extreme valued pixels (possibly noise) are, optionally, removed to prevent anomalous results. Further, since color is often a cyclic phase-encoded component of the signal, such 'stretching' will not necessarily be effective; however, recent practices, e.g., sending sample of color bars in the VBI which are referenced, are effective alternatives.

Returning now to the higher level operation of identifying commercials; first, the potential advertizement is analyzed by the same algorithm used to archive a library of previously seen commercials and a match is sought. If a segment cannot be identified by the AI a human operator is notified for assistance: if the human collaborator identifies the segment as belonging to the television program, it is used to further train the AI programs after the appropriate elements (e.g., characters, sets, voices, etc.) have been identified; or, if the segment is a new advertizement, it is analyzed and processed, as described above, and added to the database of known advertizements.

Another AI-assited task (either at the service or in the home system) is for ordering newscasts (on a particular subject) in order of importance. Generally, newer material is considered more relevant, yet longer material has the ability to be quickly scanned or viewed in depth with abstraction. These criteria may be in conflict, and user preferences will guide the system. Further, refernce to CC text, voice or graphics will note key word such as special bullitin, late breaking, etc. and their presence will increase a measure of importance.

Analysis of CC Text:

Analysis of CC text (or text generated by voice recognition) is another technique that is used for segmentation, either separately, or in conjunction with the above.

Programs are recognized by word clusters; that is, words that are more frequently used in a particular television program than elsewhere. These include character names and specialized vocabulary—for example, medical terminology on a medical drama. However, an advertizement for a drug might, therefore, mimic a medical segment. Recognition of brand names help alleviate such a situation.

Similarly, word frequencies help AI suggestions of important material. For example, the word appendectomy on a medical drama is not so likely to be an important plot development as if it is encountered in a legal drama. Similarly law suit is more likely to be a major event on a medical drama than on a legal drama.

In addition to word frequencies associated with a particular show, frequency counts will also be kept for individual characters. For example, an regular character with AIDS mentioning the disease (or its being mentioned by someone else in conjunction—e.g., near in the text—with that character) is not necessarily very important; but it is if mentioned in conjunction with another character. However, such background material would be rated higher if the viewer has listed themselves as not being a 'fan' or watching infrequently.

Similarly, for individual episodes, the name of a guest character, a particular disease, a particular event (e.g., an assault), etc. may have unusual frequency in a particular episode. This says two things:
1. scenes with this word are likely to be in the same narrative thread and an AI program would make that assumption or suggestion to its human collaborator; and,
2. although normally an infrequent or 'hot' word, in this particular episode any individual instance is less important, the more often it is mentioned.

Generating Keywords as Auxiliary Information and Searching on Them:

When trawling in CC (or voice recognition) text, AI suggestions for keywords will use similar criteria both usual (e.g., which regular characters present, which location used, another drug bust or car chase) and unusual (e.g., the infrequent of hot words, above) words are good ways to categorize a scene. For informational segments, words and phrases repeated frequently are good candidates.

However, human participation will be very important here. In order for viewers requests to be effectively searched, especially by the home system, especially for a news 'video clipping' service, keywords must be well chosen.

For example, in recent coverage of the presidential voting in Florida, several features bemoaned the problems caused by 'vote counting machines' (mostly computer systems). If one were interested in clipping items on societal problems of computerization or automation, a mere search on the words 'computer' and 'problem' in the closed captioning would not have caught such segments. However, a reviewer at the inventive service who hade embedded the phrase 'problems caused by computerization/automation' would have given an opportunity for this segment to be effectively accessed.

Nevertheless, if a view then wanted to request related stories (1565), they would likely receive a barrage of stories dealing with 'elections', 'Florida', 'Bush', 'Gore', etc. but few, if any, more about the problems of computers. Consequently, the system (either the home system of the service computer, whichever is providing the search service) keeps track of which keyword(s) gained entry to a particular segment and, when similar material is requested, it is those keywords (only or, at least, preferentially) that are used to search further. If a story was not presented as the result of a search, the keywords are, optionally, presented to a viewer requesting a 'related story' for them to select the relevant ones.

Similarly, keywords are partitioned with related keywords being linked closely. That is, in the earlier example, 'Gore, Bush, president, Florida and election' would be marked tightly related, while 'computer error, voting machine, automation' would form another group. When searching for related materials, the keyword that brought the segment is weighted most relevant, tightly related key words somewhat less so, and key words in another partition even less so. However, if a story is about 'automation problems' if it is also about 'Florida presidential elections', then it is considered more similar that otherwise.

Further, another feature is an optional 'thesaurus' function that, when a search is requested on 'disease', for example, the system would also search on synonyms such as 'ailment', 'malady', etc.; and, optionally, also searches on a list of diseases, such as cancer, diabetes, etc. Similarly, words such as 'Bill Gates' and 'Microsoft' would, optionally, be given a status like synonyms.

Home Videos:

A multimedia computer or specialized settop box designed to practice the instant invention can also be used (with the addition of only a small amount of additional software) to permit home users to input their own video (910/b▶) perform edits, selections and categorizing, comprising their own auxiliary or abstraction information (through interfaces similar to FIGS. 7, 8, 15, 16 and 17) and store the integrated information (965, 984, 985/995). It is further contemplated that the instant invention be so used.

Abstractors Like Reviewers:

It is contemplated that abstraction, particularly of entertainment programs, is a highly creative activity and that 'abstractors' who are particularly adept will be highly regarded and have fans and followings. People will trust the sensibilities and editing choices of one abstractor, over another, much the same way that opinions of film reviewers are treated. Thus, it is contemplated that the inventive service will, optionally, supply several different abstractions for a single program, each prepared by a different abstraction producer (or AI program).

Advertizing:

Lastly, since one of the main features of the instant invention is the ability to remove advertisements, it is believed that advertizers and broadcasters will compensate by placing advertizements in a window of the broadcast signal simultaneous with the entertainment programming—not unlike web banner advertizements. For example, referring to FIG. 7, within a broadcast signal, window (720) would contain programming, and one or both of the other windows (710 & 730) would contain advertizing. As temporal segments are removed from the broadcast, advertizing would, thus, remain.

It is therefor the further purpose of the instant invention to incorporate into the system standard mechanisms to enlarge rectangular areas to cover the full screen, and mask other areas. The control of what area to enlarge will be accomplished by, again, auxiliary information supplied by the inventive service; or, alternatively, software in the settop box, etc., that by monitoring coherent changes in rectangular windows, senses the boundaries of areas and enlarges the programming window automatically; or, by commands remotely entered by the viewer.

Further, because of the above, it may be agreed to delay delivery of auxiliary and abstracting information: till the end of a program, the end of primetime, several hours or a day later, in order to interfere less with advertizers use of unabstracted broadcasts. Additionally, it may be arranged that certain advertizements are not edited out in abstractions by arrangement with advertizers and broadcasters—perhaps in exchange for their subsidizing viewers payments for the service. For example, users would be charged $39, $29, $19, $9 or $0 depending on whether they were willing to submit to 0, 1, 2, 4 or 8 commercials per hour.

Combination with Time Compression Technology:

In as much as a primary motivation for the instant invention is to permit harried individuals to absorb entertainment and other programming in less time that broadcast the following is performed, in combination with the above, for some embodiments.

First, particularly for car chases, shootouts, etc., which are already primarily action oriented, in lieu of or combination with excising certain sections, the entire segment (or just portions) are played a faster than normal speed. In as much as the audio bed of such segments are music and/or sounds the increase in audio speed required will not make it intelligible. Nevertheless, existing well-known technology permits audio recordings to be played faster, but the have the frequencies of the material lowered to compensate. Thus, any recording so processed will be faster, but not sound higher in pitch (although there may be some other audio distortion). Similar time compression technology is routinely used in broadcasts on audio and video in order to permit more time for commercials.

The designs, systems, algorithms, program flows, layouts, organizations, functions and business relationships described and depicted herein are exemplary. Some elements may be ordered or structured differently, combined in a single step, skipped entirely, or accomplished in a different manner. However, the elements and embodiments depicted and described herein do work. Substitution of equivalent technologies, or combination with other technologies, now in existence or later developed, are within the scope of the instant invention. Examples, without limitation, include: analog and digital technologies; functional operation implemented in special purpose hardware and general purpose hardware running control software; magnetic and optical recording; computer and television display; etc.

The details of: engineering, implementation and construction of systems; creation of program and auxiliary information; delivery of program and auxiliary information; and, implementation of the operation and human interface of functions; described herein are, generally, not, in and of themselves, the substance of the instant invention. Substitutions of, variations on, and combinations with, other processes, designs and elements, now in use or later developed, is considered to be within the scope of the invention.

It will thus be seen that the objects set forth above, among those made apparent from the preceding description, are efficiently attained and certain changes may be made in carrying out the above method and in the construction set forth. Accordingly, it is intended that all matter contained in the above description or shown in the accompanying figures shall be interpreted as illustrative and not in a limiting sense.

Now that the invention has been described, what is claimed as new and desired to be secured by Letters Patent is:

The invention claimed is:

1. An improved process for providing user controlled abstracted television programming information comprising the steps of:
    a. producing alternatively edited versions of a television programming information;
    b. extracting the edit information from said edited versions;
    c. transmitting said edit information as auxiliary information;
    d. combining said auxiliary information with said programming information; and,
    e. displaying, under control of user selection information and said auxiliary information, a selected subset of said television programming information.

2. An improved process for providing user controlled abstracted television programming information comprising the steps of:
    a. producing alternatively edited versions of a television programming information;
    b. extracting the edit information from said edited versions;
    c. combining said edit information as auxiliary information with said programming information;
    d. transmitting in combination said auxiliary information and said television programming information; and,
    e. displaying, under control of user selection information and said auxiliary information, a selected subset of said television programming information.

3. A process as in claim 1, comprising in addition the step, performed between steps d. and e., of:
    recording said television programming information and said auxiliary information.

4. A process as in claim 2, comprising in addition the step, performed between steps d. and e., of:
    recording said television programming information and said auxiliary information.

5. A process as in claim 1, wherein said controlled display is performed by a settop box.

6. A process as in claim 2, wherein said controlled display is performed by a settop box.

7. A process as in claim 3, wherein said controlled display is performed by a settop box.

8. A process as in claim 4, wherein said controlled display is performed by a settop box.

9. A process as in claim 1, wherein said auxiliary information is contained in a video blanking interval.

10. A process as in claim 2, wherein said auxiliary information is contained in a video blanking interval.

11. A process as in claim 3, wherein said auxiliary information is contained in a video blanking interval.

12. A process as in claim 4, wherein said auxiliary information is contained in a video blanking interval.

13. A process as in claim 1, wherein said abstracted television programming information comprises at least three levels of progressively summarized material.

14. A process as in claim 2, wherein said abstracted television programming information comprises at least three levels of progressively summarized material.

15. A process as in claim 3, wherein said abstracted television programming information comprises at least three levels of progressively summarized material.

16. A process as in claim 4, wherein said abstracted television programming information comprises at least three levels of progressively summarized material.

17. An improved process for providing user controlled abstracted programming information, further comprising progressively summarized abstractions of programming information comprising the steps of:
    a. producing alternatively edited versions of said programming information, itself comprising at least one narrative stream, by a process resulting in the equivalent of the steps of:
        a1. optionally segmenting said programming information to create segmented programming information;
        a2. optionally decollating said segmented programming information to create a multiplicity of separate narrative streams;
        a3. producing progressively summarized abstractions of at least some of said narrative streams to create progressively abstracted streams; and,
        a4. optionally re-collating said progressively abstracted streams, for at least one level of abstraction;
    b. extracting the edit information corresponding to said edited versions;
    c. transmitting said edit information as auxiliary information;
    d. utilizing, under control of user selection information and said auxiliary information, a selected subset of said programming information.

18. A process as in claim 17, employing artificial intelligent segmentation software.

19. A process as in claim 18, employing feature recognition software.

20. A process as in claim 17, employing software that reduces the resolution of a segment and matches it to reduced-resolution versions of known segments.

* * * * *